US009754182B2

(12) United States Patent
Pope

(10) Patent No.: US 9,754,182 B2
(45) Date of Patent: Sep. 5, 2017

(54) DETECTING KEYPOINTS IN IMAGE DATA

(71) Applicant: Apple Inc., Cupertino, CA (US)

(72) Inventor: David R. Pope, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/843,919

(22) Filed: Sep. 2, 2015

(65) Prior Publication Data
US 2017/0061236 A1    Mar. 2, 2017

(51) Int. Cl.
*G06K 9/00* (2006.01)
*G06K 9/46* (2006.01)
(Continued)

(52) U.S. Cl.
CPC ....... *G06K 9/4671* (2013.01); *G06K 9/00973* (2013.01); *G06K 9/4652* (2013.01);
(Continued)

(58) Field of Classification Search
CPC .. G06K 9/00; G06K 9/00228; G06K 9/00248; G06K 9/00268; G06K 9/00281; G06K 9/00288; G06K 9/00624; G06K 9/0063; G06K 9/00664; G06K 9/00791; G06K 9/00805; G06K 9/3233; G06K 9/20–9/28; G06K 9/36; G06K 9/40; G06K 9/44–9/4609; G06K 9/4623–9/4628; G06K 9/4652; G06K 9/52; G06K 9/54–9/6252; G06K 9/4661–9/4676; G06K 9/685–9/6857; G06K 2009/6864–2009/6871;
(Continued)

(56) References Cited

U.S. PATENT DOCUMENTS 7,672,505 B2    3/2010 Sasaki
8,625,902 B2 *  1/2014 Baheti .................. G06K 9/6857
                                                        382/190
(Continued)

OTHER PUBLICATIONS

International Search Report and Written Opinion from PCT/US2016/047829, Date of mailing Nov. 9, 2016, Apple Inc., pp. 1-19.
(Continued)

*Primary Examiner* — Jose Couso
(74) *Attorney, Agent, or Firm* — Robert C. Kowert; Myertons, Hood, Kivlin, Kowert & Goetzel, P.C.

(57) ABSTRACT

Methods and systems for detecting keypoints in image data may include an image sensor interface receiving pixel data from an image sensor. A front-end pixel data processing circuit may receive pixel data and convert the pixel data to a different color space format. A back-end pixel data processing circuit may perform one or more operations on the pixel data. An output circuit may receive pixel data and output the pixel data to a system memory. A keypoint detection circuit may receive pixel data from the image sensor interface in the image sensor pixel data format or receive pixel data after processing by the front-end or the back-end pixel data processing circuits. The keypoint detection circuit may perform a keypoint detection operation on the pixel data to detect one or more keypoints in the image frame and output to the system memory a description of the one or more keypoints.

20 Claims, 10 Drawing Sheets

(51) Int. Cl.
*H04N 9/64* (2006.01)
*G06T 7/40* (2017.01)
*G06T 5/00* (2006.01)
*G06T 7/10* (2017.01)

(52) U.S. Cl.
CPC .............. *G06K 9/4661* (2013.01); *G06T 5/00* (2013.01); *G06T 7/10* (2017.01); *G06T 7/408* (2013.01); *H04N 9/646* (2013.01); *G06K 2009/4666* (2013.01); *G06T 2200/28* (2013.01); *G06T 2207/20164* (2013.01)

(58) Field of Classification Search
CPC .......... G06K 19/0716–19/0719; G06T 1/0007; G06T 5/006; G06T 5/009; G06T 7/20; G06T 2207/10016; G06T 2207/10021; G06T 2207/10024; G06T 2207/20208; G06T 5/00–5/50; G06T 7/00–7/0044; G06T 7/408; H04N 5/2226; H04N 5/2254; H04N 5/2258; H04N 5/23229; H04N 5/23238; H04N 5/2351; H04N 5/262; H04N 5/2621; H04N 5/265; H04N 5/3532; H04N 5/5357; H04N 9/045; H04N 9/097; H04N 5/213–5/2178; H04N 5/232–5/23222; H04N 5/335; H04N 5/353–5/35527; H04N 5/53–5/57; H04N 9/646; H04N 19/43–19/436
See application file for complete search history.

(56) References Cited

U.S. PATENT DOCUMENTS

| | | | |
|---|---|---|---|
| 8,872,946 B2 | 10/2014 | Cote et al. | |
| 9,025,077 B2 | 5/2015 | Attar et al. | |
| 9,082,235 B2* | 7/2015 | Lau .......................... | G07C 9/00 |
| 2012/0008002 A1 | 1/2012 | Bigioi et al. | |
| 2012/0050567 A1 | 3/2012 | Cote et al. | |
| 2013/0272548 A1* | 10/2013 | Visser ................ | G06K 9/00624 |
| | | | 381/122 |
| 2014/0052555 A1 | 2/2014 | MacIntosh | |
| 2014/0085501 A1* | 3/2014 | Tran .................... | H04N 5/23238 |
| | | | 348/222.1 |
| 2016/0292887 A1* | 10/2016 | Cho ......................... | G06T 7/408 |
| 2016/0358338 A1* | 12/2016 | Tsunoda ................ | G06T 7/0081 |

OTHER PUBLICATIONS

David G. Lowe, "Distinctive Image Features from Scale-Invariant Keypoints", International Journal of Computer Vision, vol. 60, No. 2, Jan. 5, 2004, pp. 1-28.

Lifan Yao, et al., "An Architecture of Optimised SIFT Feature Detection for an FPGA Implementation of an Image Matcher", Field-Programmable Technology (FPT 2009), International Conference on IEEE, Dec. 9, 2009, pp. 30-37.

Eric Nowak; et al., "Sampling Strategies for Bag-of-Features Image Classification", Security in Communication Networks; Third International Conference; Sep. 11-13, 2002, pp. 490-503.

Shuang Bai, et al., "Informative patches sampling for image classification by utilizing bottom-up and top-down Information", Machine Vision and Applications, Springer Verlag, DE, vol. 24. No. 5, Jan. 5, 2013, pp. 959-970.

Joseph Yu, "OpenCV Python SIFT-How to reduce the number of Keypoints", Stack Overflow Community, Retrieved from URL: http://stackoverflow.com/questions/28687100/opencv-python-sift-how-to-reduce-the-number-of-keypoints; Feb. 24, 2015, p. 1.

Anonymous, "SIFT-Extract less keypoint with opencv", Stack Overflow Community, Retrieved from URL: http://stackoverflow.com/questions/11135546/extract-less-keypoing-with-opencv, Jun. 21, 2012, pp. 1-2.

Kadir A Peker, "Can I compute the SIFT descriptor for arbitrary corner points in the images (those not necessarily found using DoG and hence for which I don't know the scale and orientation)?", Retrieved from URL: htpps://www.quora.com/Can-I-compute-the-SIFT-descriptor-for-arbitrary-corner-points-in-the-image-those-not-necessarily-found-using-DoG-and-hence-for-which-I-dont-know-the-scale-and-orientation, Apr. 16, 2015, pp. 1-3.

* cited by examiner

700

| block 702A<br>threshold A<br>keypoint A1<br>keypoint A2 | block 702B<br>threshold B<br>keypoint B1 | block 702C<br>threshold C | ... | |
|---|---|---|---|---|
| block 702D<br>threshold D | block 702E<br>threshold E<br>keypoint E1<br>keypoint E2 | block 702F<br>threshold F<br>keypoint F1<br>keypoint F2<br>keypoint F3 | | |
| block 702G<br>threshold G<br>keypoint G1 | block 702H<br>threshold H | block 702I<br>threshold I | | |
| ... | | | ... | |
| | | | | block 702N<br>threshold N<br>keypoint N1<br>keypoint N2<br>keypoint N3 |

*FIG. 7*

DETECTING KEYPOINTS IN IMAGE DATA

BACKGROUND

Image data captured by an image sensor is often initially processed as part of an image processing pipeline in order to prepare the captured image data for further processing or consumption. In this way, real-time corrections or enhancements can be made without consuming other system resources. For example, raw image data may be corrected, filtered, or otherwise modified to provide subsequent components, such as a video encoder, with appropriately scaled image data for encoding and subsequent display, reducing a number of subsequent operations to be performed on the image data at the video encoder.

In order to implement these corrections or enhancements for captured image data, various different devices, components, units, or other modules may be used to implement the varying operations performed as part of an image processing pipeline. An image signal processor, for instance, may include multiple different units or stages at which different image modifications or enhancements can be made to image data obtained from an image sensor. Image processing systems may include systems for machine vision, which provides automated analysis and inspection functionality for images detected by an image sensor module. Machine vision algorithms may identify points of interest (sometimes referred to as keypoints) in an image that facilitate the identification and/or tracking of objects in one or more images. Given the computationally intensive nature of machine vision algorithms, a more efficient implementation of these systems is desirable.

SUMMARY

Methods and systems for detecting keypoints in image data are disclosed. In an embodiment, an image signal processor system may include an image sensor interface configured to receive pixel data from an image sensor. The system may include a front-end pixel data processing circuit configured to receive pixel data for an image frame in an image sensor pixel data format and convert the pixel data in the image sensor pixel data format to a different color space format. Additionally, the system may include a back-end pixel data processing circuit configured to perform one or more noise filtering or color processing operations on the pixel data from the front-end pixel data processing circuit. Furthermore, the system may include an output circuit configured to receive pixel data from the back-end pixel data processing circuit and output the pixel data for the image frame to a system memory. In an embodiment, the system may include a keypoint detection circuit configured to receive pixel data from the image sensor interface in the image sensor pixel data format or receive pixel data after processing by the front-end pixel data processing circuit or the back-end pixel data processing circuit. The keypoint detection circuit may perform a keypoint detection operation on the received pixel data to detect one or more keypoints in the image frame and output to the system memory a description of the one or more keypoints.

In one embodiment, the system may include a multiplexer circuit connected to the keypoint detection circuit, where the multiplexer may be configured to select pixel data from the image sensor interface, the system memory, or the back-end pixel data processing circuit, and the multiplexer may be configured to provide the pixel data to the keypoint detection circuit. In an embodiment, the system may include a pre-processing module connected between the multiplexer and the keypoint detection circuit that is configured to convert the pixel data into luminance channel data. In one embodiment, the system may include a keypoint control parameter storage structure connected to the keypoint detection circuit. The keypoint control parameter storage structure may be configured to store multiple keypoint sensitivity threshold values corresponding to a first set of respective regions of the image frame and output the description of the one or more keypoints detected in the first set of respective regions of the image frame in response to respective magnitude values of the one or more keypoints exceeding one of the multiple keypoint sensitivity threshold values corresponding to the first set of respective regions of the image frame. Additionally, the keypoint detection circuit may output a count of keypoints detected in the first set of respective regions of the image frame that is usable by program instructions to dynamically adjust one of the multiple keypoint sensitivity threshold values. In an embodiment, the keypoint control parameter storage structure may be configured to store a programmable maximum limit of allowable keypoints for each of a second set of respective regions of the image frame usable by the keypoint detection circuit to output the description of a total number of keypoints for each of the second set of respective regions of the image frame, where the total number of keypoints for each of the second set of respective regions does not exceed the programmable maximum limit of allowable keypoints. The keypoint control parameter storage structure may also store a programmable size of the second set of respective regions of the image frame, where the second set of respective regions corresponding to the programmable maximum limit of allowable keypoints are smaller regions of the image frame than the first set of respective regions corresponding to the multiple adjustable keypoint sensitivity threshold values. In one embodiment, the image signal processor may be configured to operate in a low power mode, such that one or more stages of the front-end pixel data processing circuit and the back-end pixel data processing circuit enter an inactive state in response to the keypoint detection circuit, detecting a same number of keypoints for a pre-defined time period, not detecting one or more keypoints for a pre-defined time period, and/or in response to determining, based on processing of the detected keypoints, that the processed keypoints correspond to a situation in which the other front-end and back-end circuits should stay in the low-power mode. The image sensor interface and the keypoint detection circuit may remain in an active state configured to continue to output the description of the one or more keypoints to the system memory while the one or more stages of the front-end pixel data processing circuit and the back-end pixel data processing circuit enter the inactive state. The one or more stages of the front-end pixel data processing circuit and the back-end pixel data processing circuit may enter an active state in response to the keypoint detection circuit detecting one or more keypoints, or determining, based on processing of the detected keypoints, that the processed keypoints correspond to an indication that front-end and back-end circuits should enter an active state (e.g., if something interesting has occurred on or within the field of view of the device).

In one embodiment, a method for an image signal processor detecting keypoints in image data may include receiving, by an image sensor interface, pixel data from an image sensor. The method may include receiving, by a front-end pixel data processing circuit, pixel data for an image frame in an image sensor pixel data format. In addition, the method may include converting, by the front-end pixel data processing circuit, the pixel data in the image sensor pixel data format to a different color space format. The method may include performing, by a back-end pixel data processing circuit, one or more noise filtering or color processing operations on the pixel data from the front-end pixel data processing circuit. Furthermore, the method may include receiving, by an output circuit, pixel data from the back-end pixel data processing circuit and outputting the pixel data for the image frame to a system memory. The method may include receiving, by a keypoint detection circuit, pixel data from the image sensor interface in the image sensor pixel data format, or receiving, by a keypoint detection circuit, pixel data after processing by the front-end pixel data processing circuit, or receiving, by a keypoint detection circuit, pixel data after processing by the back-end pixel data processing circuit. The method may include performing, by the keypoint detection circuit, a keypoint detection operation on the received pixel data to detect one or more keypoints in the image frame. The method may also include the keypoint detection circuit outputting to the system memory a description of the one or more keypoints.

In one embodiment, a device may include a central processing unit (CPU), a display connected to the CPU, a system memory connected to the CPU, and an image signal processor connected to the CPU. The image signal processor may include an image sensor interface configured to receive pixel data from an image sensor. The device may include a front-end pixel data processing circuit configured to receive pixel data for an image frame in an image sensor pixel data format and convert the pixel data in the image sensor pixel data format to a different color space format. Additionally, the device may include a back-end pixel data processing circuit configured to perform one or more noise filtering or color processing operations on the pixel data from the front-end pixel data processing circuit. Furthermore, the device may include an output circuit configured to receive pixel data from the back-end pixel data processing circuit and output the pixel data for the image frame to a system memory. In an embodiment, the device may include a keypoint detection circuit configured to receive pixel data from the image sensor interface in the image sensor pixel data format or receive pixel data after processing by the front-end pixel data processing circuit or the back-end pixel data processing circuit. The keypoint detection circuit may perform a keypoint detection operation on the received pixel data to detect one or more keypoints in the image frame and output to the system memory a description of the one or more keypoints.

BRIEF DESCRIPTION OF THE DRAWINGS

FIG. 7 is a logical block diagram illustrating an example image frame for detecting keypoints in image data, according to some embodiments.

Figure 1:
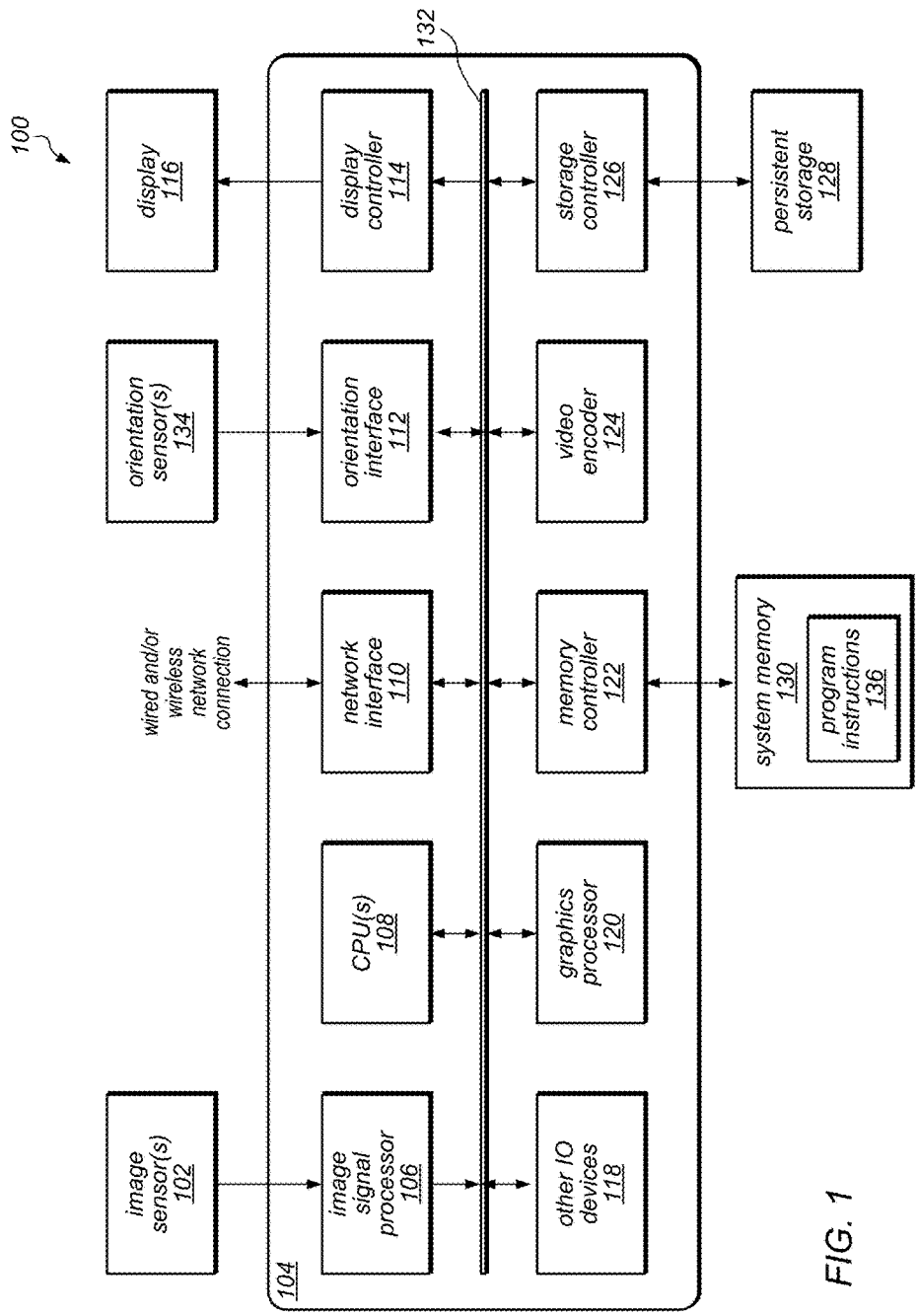
FIG. 1 is a logical block diagram illustrating an example system for detecting keypoints in image data, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An image signal processor or other image processing pipeline may implement many different techniques or components to correct or enhance image data captured by an image sensor. However, image data captured by the image sensor is not always utilized for the same purposes. For example, an image sensor may provide a stream of image data in order to display a preview image of what may be captured by the image sensor in a higher resolution still image or recorded in a video. In one embodiment, one or more hardware module(s), such as an image signal processor, may perform the computationally-intensive steps of detecting points of interest (sometimes referred to as keypoints) in an image. In an embodiment, the hardware module(s) may interface with a software application that provides further processing of the keypoint data. Hardware-based keypoint detection is well suited for object identification, object tracking, image stabilization, panorama stitching, high dynamic range (HDR) from multiple image captures, and other applications.

In various embodiments, the image signal processor may process image data in an image processing pipeline at multiple rates in order to conserve system bandwidth and more efficiently leverage the processing capabilities of the image processing pipeline. For instance, in at least some embodiments one or more front-end pipeline stages may process image data at an initial rate, such as 2 pixels per clock cycle (ppc). In this way large amounts of image data (e.g., either as large individual image frames or a high rate of image frames, such as may be captured when recording slow motion video) may receive initial processing to reduce or correct image signal noise, artifacts, and other image defects that may be introduced as a result of collecting and processing image data. The image data may then be downscaled to a desired size and processed at a different rate, such as 1 ppc, at one or more back-end pipeline stages to perform other operations on the image frames in order to reduce image signal noise, correct color and image defects, as well as apply various special effects, so that processing is not performed upon image data that may be discarded.

In at least some embodiments, image data captured and processed through front-end pipeline stages may be stored in raw (e.g., image sensor pixel data format) or full-color formats to a memory, while a scaled version of the image data may continue to be processed through the back-end pipeline stages of the image processing pipeline. In this way, high-resolution versions of image frames with some image processing may be captured while simultaneously continuing processing for lower resolution versions of the image frames (e.g., capturing high resolution stills of image frames that are also recorded in a lower resolution video).

In at least some embodiments, a back-end interface may be implemented to allow image data collected from sources different than the image sensor to be processed through back-end pipeline stage(s) of the image processing pipeline. For instance, image data received at a device that implements the image processing pipeline (e.g., a mobile computing device) from a remote device (e.g., a content server of a content provider, such as a web-based video service) may be received via the back-end interface and processed through the back-end pipeline stage(s) in order to perform operations to reduce image signal noise, correct color and image defects, or apply various special effects. In this way, the dedicated image processing components of the image processing pipeline may be utilized to efficiently perform image processing for image data received from many other sources.

The techniques described herein for detecting keypoints in image data may be further illustrated in terms of an example system that employs them. As noted above, these techniques may be implemented in any type of camera, apparatus, or computing system that includes the capability to capture and process image data, including video clips.

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes image sensor(s) 102, a system-on-a chip (SOC) component 104, system memory (e.g., dynamic random access memory (DRAM)) 130, persistent storage (e.g., flash memory) 128, and a display 116 (e.g., a liquid crystal display (LCD)). In this example, image sensor(s) 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. Image sensor(s) 102 may include respective image sensor interface(s) configured to provide image data captured by image sensor(s) 102 to one or more components of image signal processor 106. In this example, display 116 may be configured to display a preview of captured still images or video clips (which may be provided as output from image signal processor 106). Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 from which system 100 orientation data, such as motion data, may be gathered), a display controller 114 (which may be coupled to and control the operations of display 116), a graphics processor unit (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 or SOC component 104 may include more or fewer elements than those shown in FIG. 1.

In various embodiments, SOC component 104 may be a uniprocessor system including one processor, or a multiprocessor system including several processors (e.g., two, four, eight, or another suitable number). CPU(s) 108 may implement any suitable instruction set architecture, and may be configured to execute instructions defined in that instruction set architecture. For example, in various embodiments CPU (s) 108 may be general-purpose or embedded processors implementing any of a variety of instruction set architectures (ISAs), such as the x86, PowerPC, SPARC, RISC, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, superpipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data or other data used in the system, in other embodiments, the system may include other types of non-volatile memory (e.g. read-only memory (ROM)) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, keypoint identification, object mapping, object tracking, color space conversion or other non-warping image editing operations, or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. For example, video or other image data may be received from other devices (e.g., a content provider network or another mobile computing device) via network interface 110 and be stored in system memory 130 for subsequent processing (e.g., via a back-end interface to image signal processor 106, such as discussed below in FIG. 3) and display. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions stored in system memory 130 may be executed by CPU 108 or GPU 120 to provide various functions of system 100.

In other embodiments, various functions may be performed by software components executing in memory on another device and communicating with the illustrated system via inter-computer communication. Some or all of these software components or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
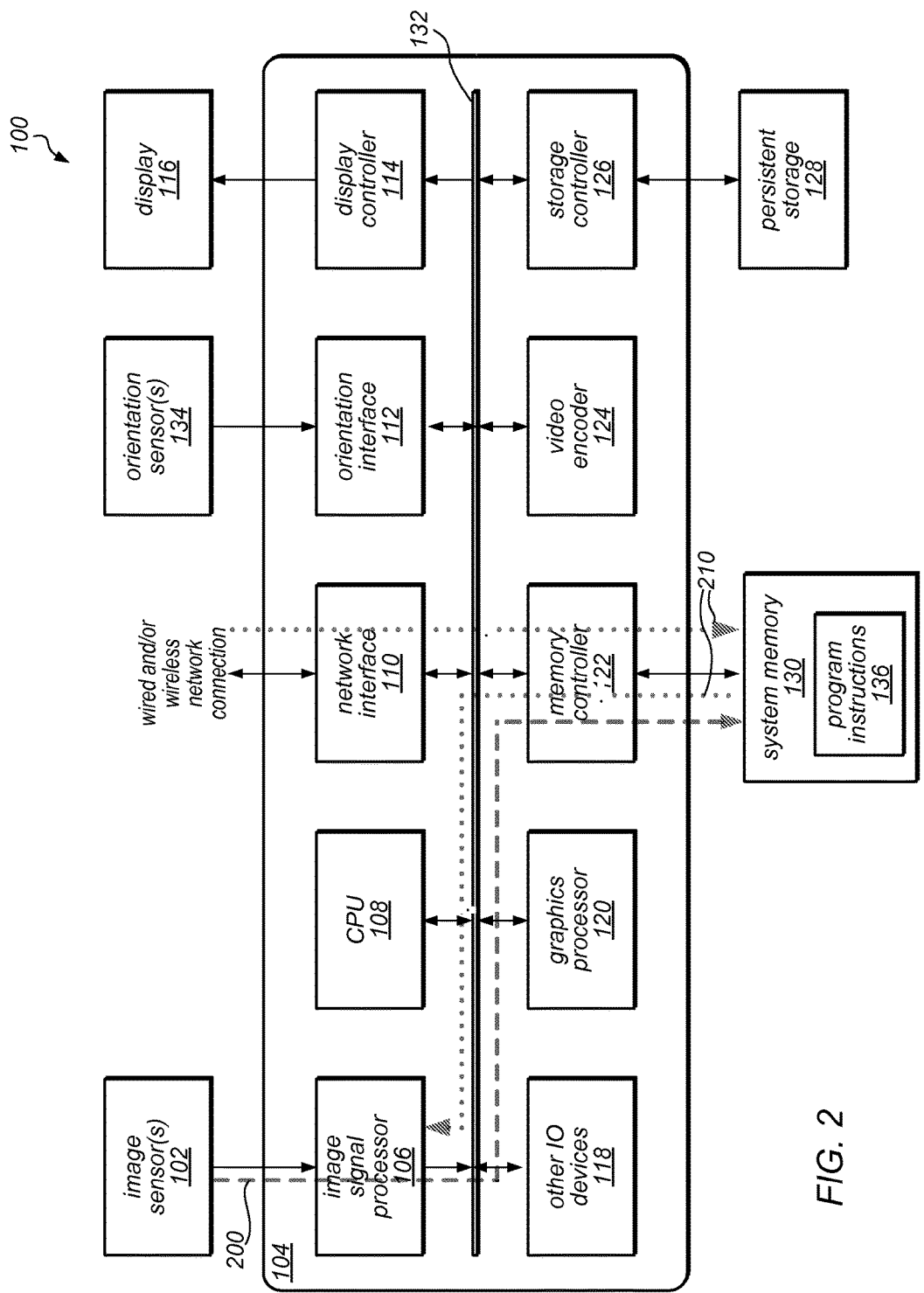
FIG. 2 is a logical block diagram illustrating example data paths in a system for detecting keypoints in image data, according to some embodiments.

FIG. 2 is a block diagram illustrating data paths in a system that implements an image signal processor (specifically, in system 100 illustrated in FIG. 1), according to some embodiments. As illustrated by the dashed lines 200, in one example image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

Another example data path is illustrated by the dotted lines 210. Image data, such as video image or data or image stills or frames, may be received system 100 from sources other than the image sensor(s) 102. In one embodiment, image data may be received by image signal processor 106 from system memory 130. In another embodiment, video data may be streamed, downloaded, or otherwise communicated to the system 100 via wired or wireless network connections from other sources remote to system 100 (e.g., a content provider network or other mobile computing device). The image data may be received via network interface 110 and written to memory 130 via memory controller 122. The image data may then be obtained by image signal processor 106 from memory 130 and processed through one or more image processing pipeline stages, in some embodiments, to perform various image correction, translation, conversion, or other image processing techniques. The image data may then be returned to memory 130, video encoder 124, or other component such as display controller 113 for display at display 116 or to storage controller 126 for storage at persistent storage 128 (not illustrated).

In some embodiments graphics processor 120 may access, manipulate, transform or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, or display controller 114) without storing the image data to system memory 130.

Figure 3:
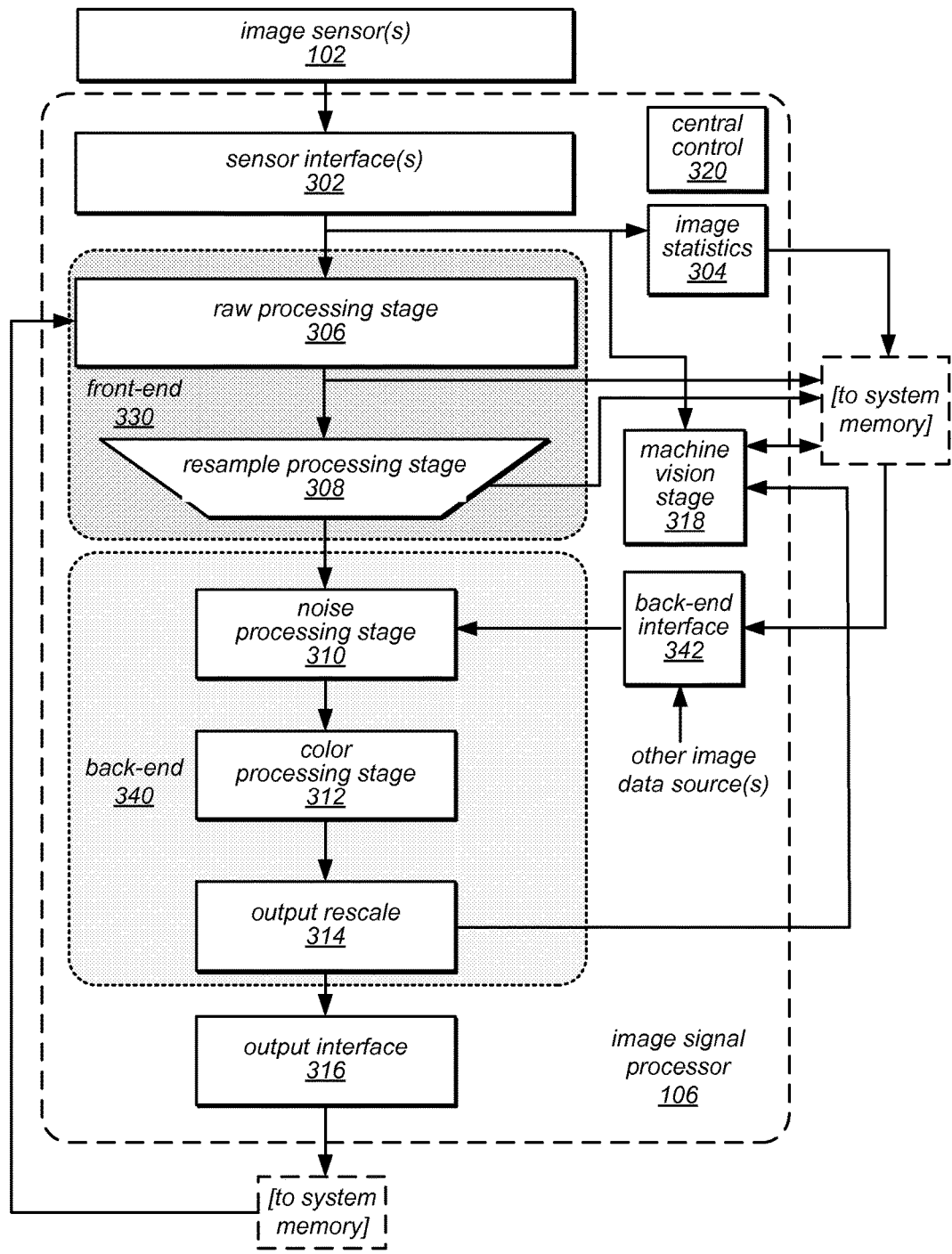
FIG. 3 is a logical block diagram illustrating an example image signal processor, according to some embodiments.

One embodiment of an image signal processing unit (ISP), such as image signal processor 106, is illustrated by the block diagram in FIG. 3. As illustrated in this example, ISP 106 may in various embodiments be coupled to image sensor(s) 102 (from which it receives image data). In this example, ISP 106 implements an image processing pipeline which may include a set of stages that process image information from creation, capture, or receipt to output. For example, the various elements illustrated as components of ISP 106 process source data received from image sensor 102 through sensor interface(s) 302 into image data processable by other stages in the pipeline (e.g., image statistics 304, raw image processing 306, resample processing stage 308, noise processing stage 310, color processing stage 312, output rescale 314, or machine vision stage 318), by other components of a system that includes ISP 106 via output interface 316 (including those that access the transformed data from the system memory after it is written to the system memory via memory controller interface 122 or are provided the image data via interconnect 132 directly) or back-end interface 342, or by other devices coupled to the system that includes ISP 106. In at least some embodiments, sensor interface(s) 302 may perform various preprocessing operations, such as pixel defect correction to detect and correct patterned defects and defect line pairs (e.g., created by special pixels like focus pixels), and image cropping or binning to reduce image data size. Note that in some embodiments, the image signal processor 106 is a streaming device. In other words, pixels may be received by the image signal processor 106 from the image sensor 102 via sensor interface(s) 302 in raster order (i.e., horizontally, line by line) and may in general be processed through its various pipeline stages in raster order, until finally being output in raster order.

Image signal processor 106 may process image data received at image signal processor (sometimes referred to as an ISP) at different rates. For example, in the embodiment illustrated in FIG. 3, image signal processor may implement one or more front-end pipeline stages 330, such as raw processing stage 306 and resample processing stage 308, which process image data at an initial rate. Thus, the various different techniques, adjustments, modifications, or other processing operations performed at these front-end pipeline stages (such as those described below with respect to raw processing stage 306 and resample processing stage 308) may be implemented so that the image data may be continuously processed through these stages at the initial rate. For example, if the front-end pipeline stages 330 process 2 pixels per clock cycle, then raw processing stage 306 operations like black level compensation, highlight recovery, defective pixel correction, and others, may process 2 pixels of image data at a time. In an embodiment, different modules within machine vision stage 318 may process image data at different rates. For example, modules in the front-end of machine vision stage 318 may process data at an initial rate, while modules towards the back-end of machine vision stage 318 may process image data at a reduced rate.

In addition to processing the image data at front-end pipeline stages at an initial rate, image signal processor 106 may implement one or more back-end pipeline stages that process image data a different rate. The back-end pipeline stages 340 may, in various embodiments, process image data at a reduced rate that is less than the initial data rate. For example, as illustrated in FIG. 3, back-end pipeline stages 340, such as noise processing stage 310, color processing stage 312, and output rescale 314, may be implemented so that the image data is processed according to the reduced rate. Given the above example of front-end stages 330 processing image data at 2 ppc, then noise processing stage 310 may implement operations such as temporal filtering and luma sharpening to process image data at a rate less than 2 ppc, such as 1 ppc.

In at least some embodiments, image signal processor 106 may implement back-end interface 342. Back-end interface 342 may receive image data from system memory and/or other image sources than image sensor(s) 102. For instance, as illustrated in FIG. 2, image data received over a wireless connection may be received and stored in memory 130. The image data may be received through back-end interface 342 for processing at back-end stages 340 of image signal processor 106. Raw processing stage 306 may, in some embodiments, be configured to receive image data from system memory 130. In this way, image signal processor 106 can be configured to provide resource efficient image processing capacity to data received from other image data source(s) instead of (or in addition to) CPU or GPU processing performed on the image data. In various embodiments, back-end interface 342 may convert image data to a format that is utilized by back-end processing stages.

In various embodiments, image signal processor 106 may implement central control module 320. Central control module 320 may configure and start the processing of image data, in some embodiments. For example, central control module 320 may implement performance monitors for logging clock cycles, memory latency, quality of service, and state information. Central control module 320 may update or manage control parameters for units, modules, stages, or other components of ISP 106, and may interface with sensor interface 302 to control the starting and stopping of the of the units, modules, stages, or other components. For example, in some embodiments, a unit, module, stage, or other component may go into an idle state during which programmable parameters may be updated by central control module 320. The unit, module, stage, or other component may then be placed into a run state, to perform one or more operations or tasks. In other examples, central control module 320 may configure image signal processor 106 to store image data (e.g., to be written to a memory, such as memory 130 in FIG. 2) before, during, or after resample processing stage 308. In this way full-resolution image data whether in raw (e.g., image sensor pixel data format) or full-color domain format may be stored in addition to or instead of processing the image data through backend pipeline stages. In one embodiment, image signal processor 106 may include a front-end pixel data processing circuit, such as raw processing stage 306 or machine vision stage 318, configured to receive raw input data directly from sensor interface(s) 302, stored image data from system memory 130, and/or processed image data from a back-end output circuit, such as output rescale stage 314, output interface 316, or other stages of back-end 340. In an embodiment, central control module 320 may access data stored in system memory 130, such as program instructions 136. In one embodiment, central control module 320 may send control signals to machine vision stage 318, thereby adjusting one or more performance parameters of machine vision stage 318.

In various embodiments, image signal processor 106 may implement image statistics module(s) 304. Image statistics module(s) 304 may perform various functions and collect information to be stored in a memory, such as system memory 130. Image statistics module may, in some embodiments perform sensor linearization, defective pixel replacement, black level compensation, lens shading correction, and inverse black level compensation in order to collect image information as a result of the various operations. Statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting. In some embodiments, certain pixel values, or areas of pixel values may be excluded from statistics collections, such as from AF statistics, when the statistics operations like sensor linearization, defective pixel replacement, black level compensation, lens shading correction, and inverse black level compensation identify clipped pixels. In scenarios where multiple image statistics modules 304 are implemented, each statistic module may be programmed by central control module 320 to collect different information for the same image data, or different image data collected for different images (e.g., collected from different ones of image sensor(s) 102).

As noted above, image signal processor 106 may implement one or multiple front-end pipeline stages, such as raw processing stage 306, resample processing stage 308, and machine vision stage 318, which may process image data in raw or full-color domains. Raw processing stage 306 may, in various embodiments implement a variety of modules, units, or components to perform various operations, functions, or tasks on raw image data. Bayer raw format, for example, may be image data from collected from image sensor(s) 102 that implement a Bayer pattern of pixel sensors. For instance, some sensor pixels only capture green light, while other pixels capture red or blue light in Bayer pattern of pixels. In this way, image data in Bayer raw image format (or other raw image format captured by a color filter array in an image sensor) provides pixel data with values specific to a particular color (instead of all colors).

A front-end pixel data processing circuit, such as raw processing stage 306, may thus process image data in a raw format (e.g., an image sensor pixel data format such as Bayer raw format) applying various operations including, but not limited to, sensor linearization, black level compensation, fixed pattern noise reduction, defective pixel correction, raw noise filtering, lens shading correction, white balance gain, and highlight recovery. A sensor linearization unit may, in some embodiments, map non-linear image data to linear space for other processing (e.g., to convert image data from a companding format collected from a High Dynamic Range (HDR) image sensor which may be one of image sensor(s) 102). Black level compensation may, in some embodiments, be performed to provide digital gain, offset and clip independently for each color component (e.g., Gr, R, B, Gb) on the pixels image data (which may occur after sensor linearization). In some embodiments, fixed pattern noise reduction may be performed to remove offset fixed pattern noise and gain fixed pattern noise by subtracting a dark frame from an input image and multiplying different gains to pixels, in some embodiments. Defective pixel correction may determine or identify defective pixels, and may replace defective pixel values, in various embodiments. Raw noise filtering may reduce noise of image data, in various embodiments, by averaging neighbor pixels that are similar in brightness. Highlight recovery may, in various embodiments, estimate pixel values for those pixels that are clipped (or nearly clipped) from other channels. Lens shading correction may apply a gain per pixel to compensate for a dropoff in intensity roughly proportional to a distance from a lens optical center. White balance gains may provide digital gains for white balance, offset and clip independently for all color components (e.g., Gr, R, B, Gb in Bayer format). Please note that various examples and descriptions provided above are not intended to be limiting as to the various techniques, components, or formats of a front-end pixel data processing circuit, such as raw processing stage 306, but are instead merely provided as examples. Various components, units, or modules may be broken apart into multiple different pipeline processing stages. Also note that in some embodiments, various ones of the components, units, or modules may convert raw image data (e.g., pixel data in an image sensor pixel data format) into full-color domain, and thus raw processing stage 306 may, at various portions, process image data in the full-color domain in addition to or instead of raw image data. For instance, a simple demosaic unit may receive data from raw noise filtering and interpolate a full-color domain for raw image data to perform lens shading correction, white balance gain, or highlight recovery before converting the image data back to a raw image format.

In various embodiments, image signal processor 106 may implement resample processing stage 308. Resample processing stage 308 may perform various operations to convert, resample, and/or scale image data received from a front-end pixel data processing circuit, such as raw processing stage 306, and may provide as output image data according to a reduced rate such as may be implemented in back-end pixel data processing circuit(s), such as back-end pipeline stages 340. Please note, that in some embodiments, some or all of the portions of resample processing stage may be implemented as part of raw processing stage and thus the previous description is provided as an example pipeline stages in an image processing pipeline which may implement the detection of keypoints in image data.

In various embodiments, image signal processor 106 may implement a front-end pixel data processing circuit, such as machine vision stage 318. Machine vision stage 318 may perform various operations to detect keypoints in image data received from multiple sources, including sensor interface(s) 302 (e.g., raw pixel data in an image sensor pixel data format), a memory (e.g., system memory 130), and/or a back-end output circuit (e.g., output rescale 314), as discussed in further detail below with regard to FIG. 4. In various embodiments, machine vision stage 318 may also be configured to detect keypoints in image data received from other front-end pipeline stages of ISP 106 or various back-end pipeline stages of ISP 106. In one embodiment, machine vision stage 318 may provide output image data according to a reduced rate, such as may be implemented a back-end pipeline stages 340.

In various embodiments, image signal processor 106 may implement one or more back-end pixel data processing circuit(s), such as back-end pipeline stages 340, to process image data at rate that is less than the initial rate for processing image data in front-end stages 330 (e.g., 4 ppc initial rate>3, 2, or 1 ppc reduced rate). In at least some embodiments, back-end pipeline stages 340 may process image data according to a particular full-color format (e.g., YCbCr 4:4:4 or RGB) in which resample processing stage 308 or back-end interface 342 may provide to back-end stages 340. Please note, that in some embodiments, various ones of the back-end stages 340 may be configured to convert image data to the particular full-color format (or may utilize different full-color formats for processing), and thus the previous example is not intended to be limiting.

Image signal processor 106 may implement noise processing stage 310, in some embodiments. Noise processing stage 310 may, in various embodiments implement a variety of modules, units, or components to perform various operations, functions, or tasks, in different orders, such as gamma/de-gamma mapping, color space conversion, temporal filtering, noise filtering, luma sharpening, and chroma noise reduction. Color space conversion may convert image data to another color format or space (e.g., RGB to YCbCr). Gamma mapping may provide non-linear mapping functions for particular color channels of pixel data (e.g., Y, Cb, and Cr channels) in order to apply different image effects, including, but not limited to, black and white conversion, sepia tone conversion, negative conversion, or solarize conversion). Temporal filtering may be performed, in various embodiments, to filter image signal noise based on pixel values from a previously filtered image frame. Pixel values from the previously filtered image frame (which may be referred to herein as the reference image frame), may be combined with pixel values of a current image frame to get a best estimate of the pixel values. For example, a temporal filter may average the pixel values in the current image frame and the corresponding pixels in the reference image frame when the current image frame and the reference image frame are similar. In at least some embodiments, temporal filtering may be performed upon individual color channel values. For instance, a temporal filter may filter Y color channel values (from image data in YCbCr format) with Y color channel values in the reference frame (without filtering on other channels like Cb or Cr).

Other noise filtering, such as spatial noise filtering may be performed. In at least some embodiments, luma sharpening and chroma suppression may be performed to as part of spatial noise filtering in simultaneous or near simultaneous fashion. Luma sharpening may sharpen luma values of pixel data, in some embodiments. Chroma suppression may attenuate chroma to gray (i.e. no color), in some embodiments. The aggressiveness of noise filtering may be determined differently for different regions of an image, in some embodiments. Spatial noise filtering may be included as part of a temporal loop implementing temporal filtering as discussed above. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame). Please note that various examples and descriptions provided above are not intended to be limiting as to the various techniques or components implemented as part of noise processing stage 310, but are instead merely provided as examples.

Image signal processor 106 may implement color processing stage 312, in some embodiments. Color processing stage 312 may, in various embodiments implement a variety of modules, units, or components to perform various operations, functions, or tasks, in different orders, such as local tone mapping, gain/offset/clip, color correction, three-dimensional color lookup, gamma conversion, and color space conversion. Local tone mapping may, in some embodiments, apply spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may apply spatially varying and intensity varying color correction matrices, which may, for example, be used to darken highlights and brighten shadows in an image. Digital gain, offset and clip may be provided for each color channel or component of image data, in some embodiments. Color correction may be implemented, in some embodiments, applying a color correction transform matrix to image data. 3D color lookup may utilize a three dimensional array of color component output values (e.g., R, G, B) to perform advanced tone mapping, color space conversions, and other color transforms, in some embodiments. Gamma conversion may be performed, mapping input image frame data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

In various embodiments, image signal processor 106 may implement a back-end output circuit, such as output rescale module 314. Output rescale module 314 may resample, transform and correct distortion on the fly as the ISP 160 processes image data. Output rescale module 314 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion). Output rescale 314 may provide image data via output interface 316 to various other components of system 100, as discussed above with regard to FIGS. 1 and 2.

In one embodiment, image signal processor 106 may be configured to include a "power save" or "low power" mode, in which multiple stages of the ISP pipeline may be temporarily powered down (i.e., enter an inactive state or be turned off) while other stages, including at least image sensor(s) 102 and a front-end pixel data processing circuit (e.g., machine vision stage 318), may remain powered on and active. Machine vision stage 318, and sometimes also program instructions 136 of system memory 130, may monitor real-time image data received from image sensor(s) 102 via image sensor interface modules and determine whether to "wake up" the other stages of image signal processor 106 (i.e., trigger the other stages to power up, turn on, or enter an active state) in response to one or more keypoint(s) being detected, a change in a number of keypoints detected, a change in a location or region of a field of view in which keypoints are detected, a change in image data near a region where a keypoint was detected, and/or change in a rate at which keypoints are being detected. Similarly, the keypoint detection module may determine, based on processing of detected keypoints (i.e., based on post processing), that the processed keypoints correspond to a situation in which the other front-end and back-end circuits should stay in the low-power mode. For example, if a mobile phone equipped with a camera and an ISP is resting on a table the image sensor(s) may be recording no data (if the camera is face down) or a steady image (if the camera is face up) while other modules of the phone, such as the display and various front-end and back-end ISP modules, may be temporarily powered down to an inactive state. This steady state, which may be detected in response to a lack of real-time keypoint detections over a pre-defined time period and/or constant keypoint data over a pre-defined time period, may be interpreted as a "sleep" state. If a user then picks up the mobile phone, then the image sensor(s) may suddenly be oriented towards a different scene and thereby detect new keypoint data. Similarly, the keypoint detection module may determine, based on processing of the detected keypoints, that the processed keypoints correspond to an indication that front-end and back-end circuits should enter an active state (e.g., if something interesting has occurred on or within the field of view of the device). This sudden user interaction, which may be detected by real-time changes in the number, location and/or magnitude of keypoints detected by machine vision stage 318, may be interpreted as a wake-up signal. The power save mode (i.e., low power mode) thus enables image signal processor 106 to conserve power by temporarily turning off one or more ISP pipeline stages when a user is not actively handling the mobile device and/or by turning on the inactive ISP modules and/or phone display when the user actively handles the mobile device.

Note also that, in various embodiments, the functionally of units 302-342 may be performed in a different order than the order implied by the order of these functional units in the image processing pipeline illustrated in FIG. 3, or may be performed by different functional units than those illustrated in FIG. 3. Moreover, the various components, units, processes, or other functionalities described in FIG. 3 (or subsequent FIGS. 4-9) may be implemented in various combinations of hardware or software.

Figure 4:
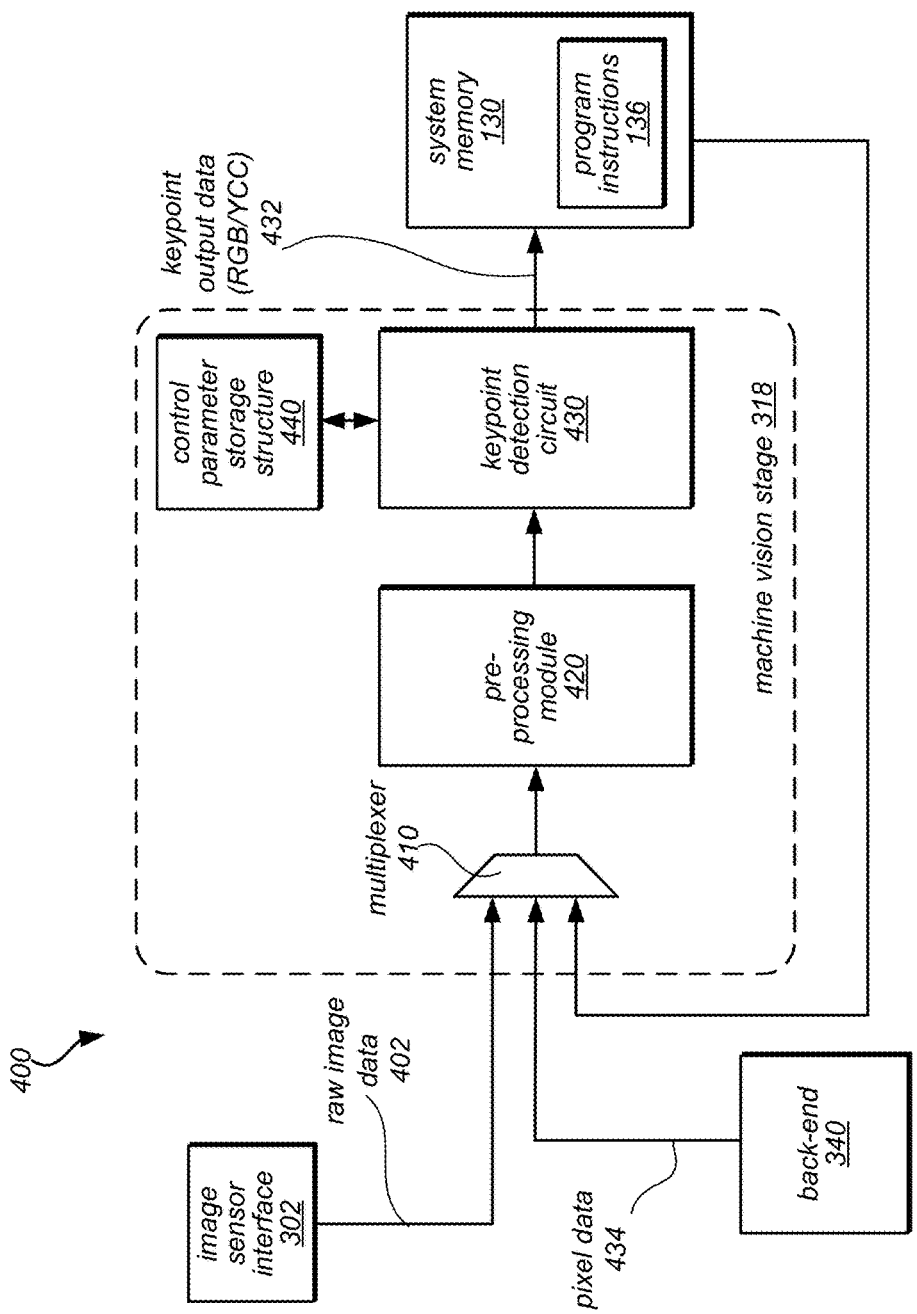
FIG. 4 is a logical block diagram illustrating a machine vision stage in an image signal processor, according to some embodiments.

As noted above, in various embodiments different stages may configured to process image data at different rates, such as front-end pipeline stages 330 processing image data at an initial rate and back-end pipeline stages 340 processing image data at a reduced rate. Machine vision stage 318 may, in various embodiments, be configured to receive image data from raw processing stage at the initial data rate, process the image data, and provide output image data at the reduced image rate. FIG. 4 is a logical block diagram illustrating a machine vision stage 318 in an image signal processor 400, according to some embodiments.

Figure 5:
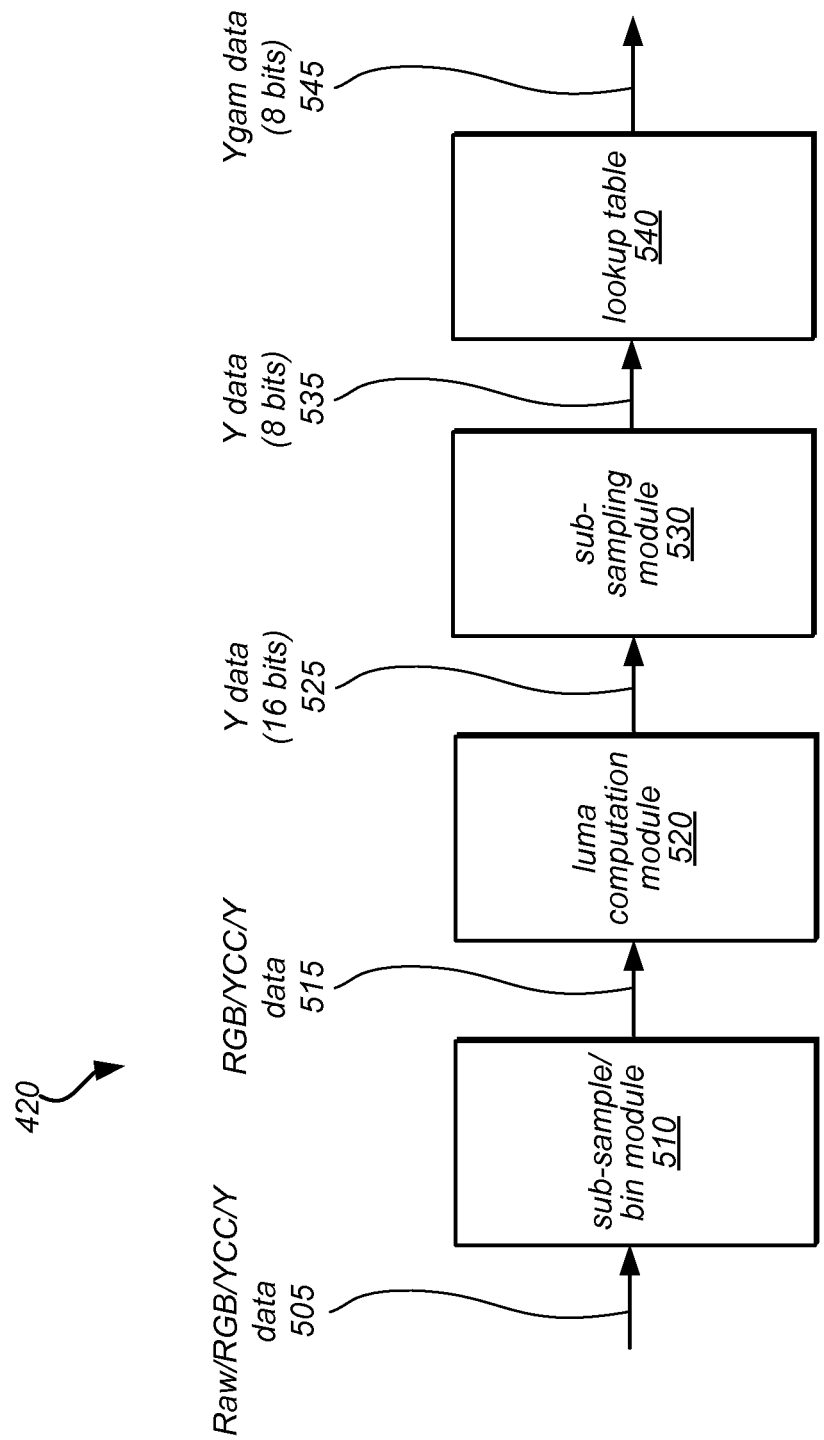
FIG. 5 is a logical block diagram illustrating a pre-processing module in an image signal processor, according to some embodiments.

In various embodiments, a front-end pixel data processing circuit, such as machine vision stage 318, may receive input data from multiple sources, including raw image data 402 from sensor interface(s) 302, processed image data (e.g., red green blue (RGB), or luminance blue-difference red-difference chroma (YCbCr)) from system memory 130, or processed output data from back-end module 340 (e.g., Y data from an output circuit at the back-end of the pipeline, or full color output data). In an embodiment, multiplexer 410 may be configured to accept data from multiple input sources and dynamically select the data into a single line coupled to pre-processing module 420, which may be configured to convert data from various pixel formats (e.g., raw pixel data, RGB formats, YCC formats, and single channel Y input data) into a luminance channel. In one embodiment, pre-processing module 420 may perform sub-sampling or other functions to reduce the size of input image data (e.g., by binning down the data). In one embodiment, pre-processing module 420 may also include one or more sub-modules for luminance computation. In some embodiments, pre-processing module 420 may subsample and/or bin the input data and then compute luminance values via a weighted average of the input channels. In an embodiment, pre-processing module 420 may use a lookup table (LUT) to facilitate global tone mapping and/or gamma correction of the luminance image data. Pre-processing module 420 and multiplexer 410 may thus enable machine vision stage 318 to receive image data from multiple sources and convert the image data down to one or more color channel(s), where the particular color channel may be selected or programmed dynamically. An embodiment of sub-modules (to perform luma computation and other functions) of pre-processing module 420 is illustrated in FIG. 5, which is discussed in detail below.

In one embodiment, a pre-processing module (e.g., pre-processing module 420) converts the input image data into a luminance image or luminance channel. In an embodiment, computing a luminance image may include a weighted average of multiple luminance channels. In one embodiment, a weighted average of channels may be skipped if the input data is YCbCr data or a Y input image. In another embodiment, a sub-sampling may be performed to produce a further reduction in the size of the input image for the keypoint detection circuit. For example, if 2048 pixel wide data is input into a pre-processing module, then the pre-processing module and/or a sub-sampling module may reduce the data to width of 512 pixels for efficient processing by a keypoint detection circuit.

In various embodiments, a back-end scaler module, such as output rescale 314, may provide one or more outputs of image data at the same or different rates. For instance, in some embodiments, back-end 340 may provide image data that is in the full-color domain and scaled at a reduced rate to other image signal processor pipeline stages for further processing. In some embodiments, the full-color scaled image single channel output data 434 may be additionally (or alternatively) written to system memory 130 to be stored for future processing or display. In an embodiment, the type of single channel color data accepted by machine vision stage 318 may be dynamically adjustable (i.e., programmable). In one embodiment, modules in the front-end of machine vision stage 318, such as multiplexer 410 and pre-processing module 420, may process data at an initial rate, while modules towards the back-end of machine vision stage 318, such as keypoint detection circuit 430, may process image data at a reduced rate thereby conserving bandwidth in the image signal processor system. Multiplexer 410 and pre-processing module 420 may thus provide up-front data massaging that enables machine vision stage 318 to accept input data from multiple input sources (e.g., one or more image sensors, a memory, one or more back-end pipeline stages, or one or more front-end pipeline stages) for processing by keypoint detection circuit 430. In an embodiment, keypoint detection circuit 430 may thus be a sub-module of machine vision stage 318 that is capable of operating on raw data from image sensor interface(s) 302 (e.g., pixel data that has not yet been processed or otherwise written to memory), while also being configured to selectively operate on processed data from memory and/or other sources in ISP 106.

In one embodiment, machine vision stage 318 and/or keypoint detection circuit 430 may include one or more spatial filter modules, sometimes referred to as "box filters", configured to compute an approximation of Gaussian derivatives of Hessian matrix values (in the interest of efficiency) for the respective pixels in an active region of an image. In an embodiment, keypoint detection circuit 430 may use multiple spatial filters (e.g., three 9×9 spatial filters) to obtain approximations to the elements of a Hessian matrix, where the filter output values may be Dxx, Dyy, and Dxy. In various embodiments, box filter output data may be stored in local memory of keypoint detection circuit 430 (or in system memory 130) and/or included in an adjustable response map used by keypoint detection circuit 430 to process input image frame data. Keypoint detection circuit 430 may then determine whether the responses are local maxima and whether a respective local maximum is above a controllable keypoint sensitivity threshold.

In an embodiment, keypoint detection circuit 430 may implement a keypoint detection operation to identify one or more points of interest (sometimes referred to as keypoints) in image data. In one embodiment, keypoint detection circuit 430 may be hardware-based and may be configured to output a number of keypoints per region of an input image (e.g., by outputting a number of keypoints in respective areas of a grid corresponding to regions of an image). In an embodiment, keypoint detection circuit 430 may selectively operate on one channel (e.g., a dynamically programmed single channel) of image data for luminance computation. For example, keypoint detection circuit 430 may operate on a R channel, a G channel, or a B channel for an input signal of RGB data. Similarly, keypoint detection circuit 430 may operate on a Y channel for an input signal of YCbCr data.

In one embodiment, keypoint detection circuit may receive one or more programmable control values from a keypoint control parameter storage structure 440. In an embodiment, keypoint control parameter storage structure 440 may include firmware and/or one or more registers configured for storing keypoint detection control values, such as multiple keypoint sensitivity threshold values, values corresponding to programmable block sizes of a grid corresponding to an input image, or the like. In some embodiments, CPU 108 may be configured to adjust one or more settings of control parameter storage structure 440 in response to output from keypoint detection circuit 430 and/or program instructions 136. Similarly, CPU 108 may be configured to control or otherwise adjust the settings of different modules of ISP 106 at various stages of the image processing pipeline (including, but not limited to machine vision stage 318) based on output from one or more of the ISP stages. In one embodiment, keypoint detection circuit 430 may be configured to receive one or more commands from program instructions 136 and/or control parameter storage structure 440. For example, keypoint detection circuit 430 may output/report a number of keypoints detected per grid region of an image, and program instructions 136 may set and/or adjust a dynamically adjustable keypoint detection threshold value for one or more regions of the image based on the number of reported keypoints from the hardware module. In an embodiment, program instructions 136 and/or control parameter storage structure 440 may provide a programmable shift of a keypoint sensitivity threshold based on one or more response map value(s), such as a description of a keypoint and/or keypoint magnitude scores, of one or more regions of an image that is divided into a grid. The keypoint sensitivity threshold of machine vision stage 318 may thus be adjustable per region of an image based on one or more factors, such as the relative brightness, darkness, or feature shape type(s) of respective regions of the image. In various embodiments, output data from keypoint detection circuit 430 may be stored in system memory 130, stored in a different location within system memory 130, and/or reported directly to other stages of the pipeline of image signal processor 106.

Figure 8:
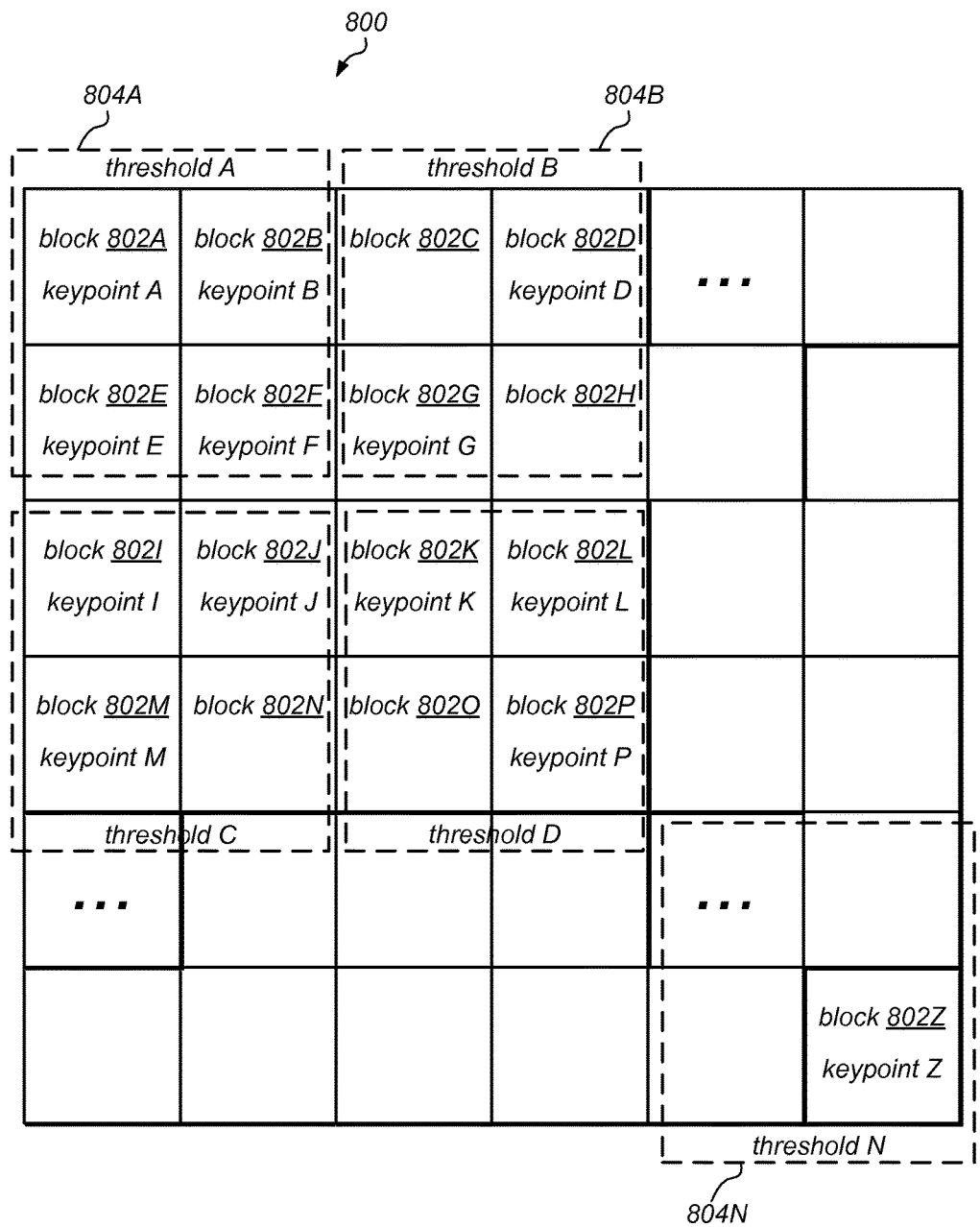
FIG. 8 is a logical block diagram illustrating an example image frame for detecting keypoints in image data, according to some embodiments.
Figure 9A:
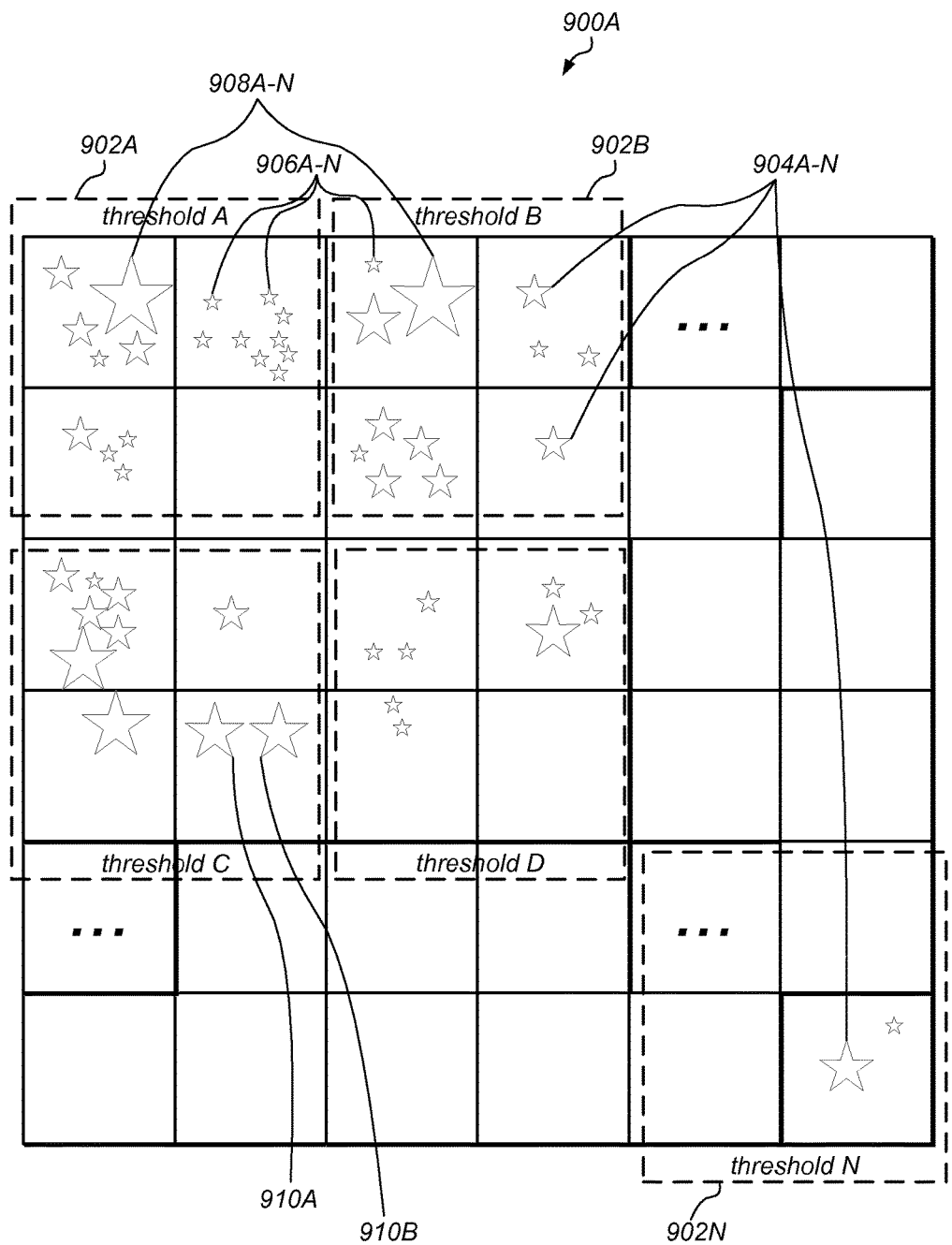
FIG. 9A is a logical block diagram illustrating an example image frame for detecting keypoints in image data, according to some embodiments.
Figure 9B:
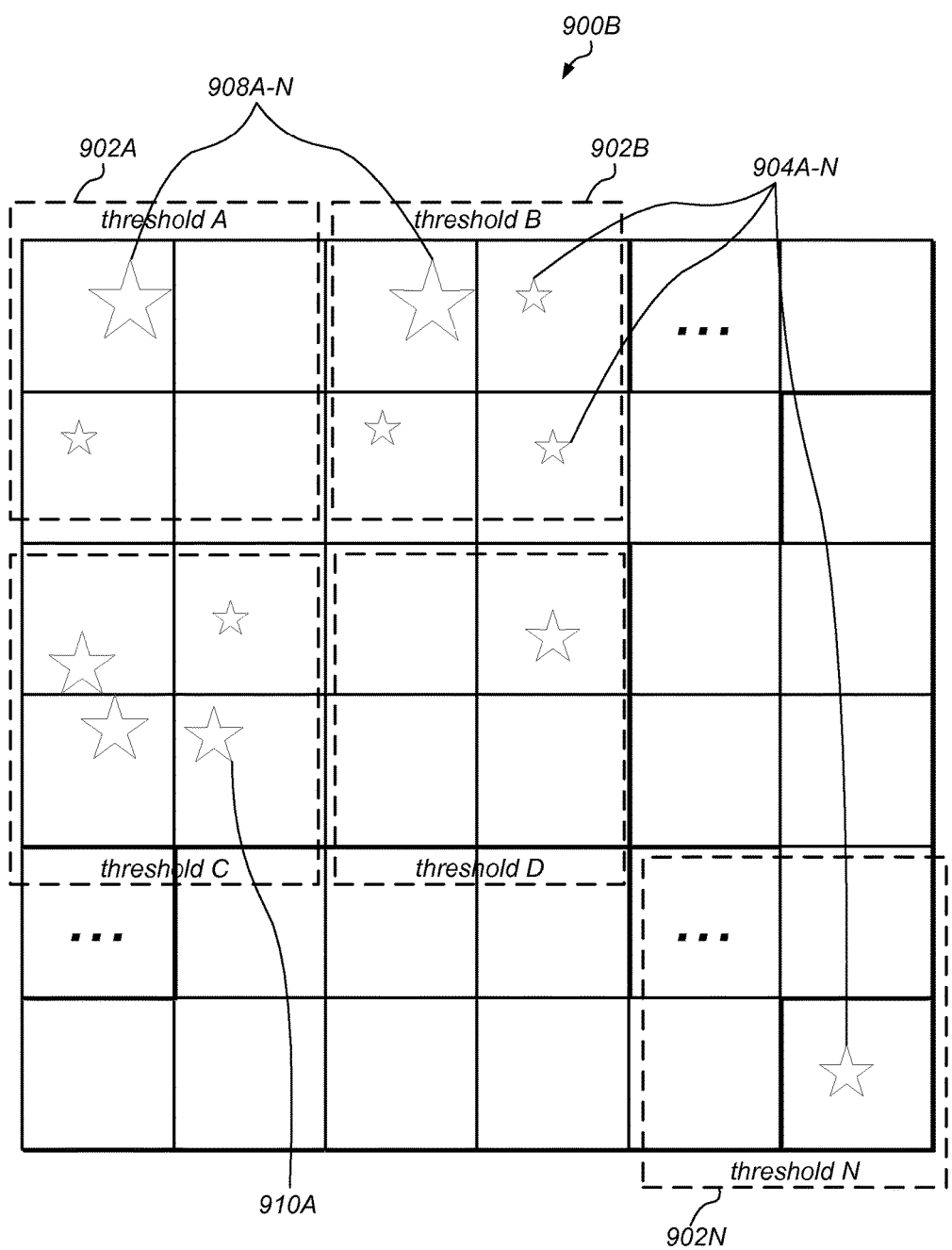
FIG. 9B is a logical block diagram illustrating an example image frame for detecting keypoints in image data, according to some embodiments.

In yet another embodiment, machine vision stage 318 may be configured (e.g., based on a setting of control parameter storage structure 440) to include an output mode having a programmable maximum limit (i.e., number) of allowable keypoints per region of an image (e.g., one keypoint per block), thereby improving the spatial uniformity of the keypoint output data by preventing an excessive number of keypoints from being output for a region of the image. Such an embodiment is illustrated in FIG. 8, FIG. 9A, and FIG. 9B, which are discussed in further detail below. For example, in an embodiment of a single maximum keypoint per region of an image grid, machine vision stage 318, keypoint detection circuit 430, and/or program instructions 136 may be configured to output only a single keypoint having a highest strength score above an adjustable keypoint sensitivity threshold value (e.g., a highest response magnitude value that exceeds a current setting of an adjustable keypoint sensitivity threshold). If keypoint detection circuit 430 does not detect any keypoints in a region of the image and/or if a region of the image does not include any keypoints having strength scores that exceed a current setting of the adjustable keypoint sensitivity threshold, then keypoint detection circuit 430 may output zero keypoints corresponding to that particular region of the image.

In one embodiment, back-end module 340 may perform various scaling, resampling, or other image data operations on the converted image data in the full-color domain. In at least some embodiments, back-end module 340 may operate in multiple modes which provide different types of scaled, resampled, or otherwise modified image data output. For instance, back-end module 340 may provide a mode that corrects or suppresses artifacts in the image data (e.g., such as suppressing chroma aliasing artifacts to remove the aliasing artifacts near luminance edges that may have been introduced by a demosaic unit or removing dot artifacts introduced by the demosaic unit) without scaling the image data. Another mode for back-end module 340 may perform image downscaling and resampling (in addition to, or instead of, correcting or suppressing artifacts in the image data), in some embodiments.

Please note that FIG. 4 is provided as merely an example of a machine vision stage 318. Different combinations of the illustrated components (as well as components not illustrated) may be used to perform conversion from raw image data into a full-color domain or scale image data. Thus, the components of FIG. 4 and their respective layout or ordering is not intended to be limiting to the various other combinations which may be used by machine vision stage 318.

FIG. 5 is a logical block diagram illustrating a pre-processing module 420 in an image signal processor, according to some embodiments. In one embodiment, pre-processing module 420 may include a sub-sample/bin module 510 configured to receive multiple types of data, such as Raw/RGB/YCC/Y data 505. The single arrow illustrated for Raw/RGB/YCC/Y data 505 may thus correspond to different types of data at different times based in part on input provided by other modules, including multiplexer 410. In various embodiments, raw data may include Bayer raw image data straight from one or more image sensor interfaces (e.g., the interfaces of image sensor(s) 102), Bayer raw image data from system memory 130, image data in a Digital Negative (DNG) raw format, or raw image data corresponding to other color filter types. In one embodiment, the processing performed by sub-sample/bin module 510 may depend on the format of the pixel data received in raw/RGB/YCC/Y data 505. For example, if raw/RGB/YCC/Y data 505 corresponds to Bayer raw image data, sub-sample/bin module 510 may sub-sample the input pixel data by a factor of 2 horizontally and by a factor of 2 vertically. A Bayer raw processing step may thus be configured to handle 2 pixels per clock cycle for input pixel data received from an image sensor interface. In an embodiment, if raw/RGB/YCC/Y data 505 corresponds to a single luminance channel or a YCC image, then the step of sub-sampling or binning may be bypassed (i.e., skipped) or performed optionally.

In one embodiment, sub-sample/bin module 510 may generate output data, such as RGB/YCC/Y data 515, and provide the output data to a luma computation module 520. In an embodiment, luma computation module 520 may be configured to perform a weighted average of multiple channels of color filter based image data. For example, luma computation module 520 may calculate a weighted average of the three channels of Bayer image data (i.e., the R, G, and B channel data) in order to compute a luminance image. In one embodiment, the luminance image computation step may be bypassed (i.e., skipped) if RGB/YCC/Y data 515 corresponds to YCC or Y input image frame data. In other words, the luminance image computation step may be programmable and may bypassed for input data corresponding to a luminance channel format. The embodiment illustrated in FIG. 5 is therefore only one possible example of a pre-processing module 420.

In an embodiment, luma computation module 520 may provide output data, such as Y data 525 in a 16 bit format to a second sub-sampling module 530, which may be configured to perform an optional further reduction in the size of the input image frame data. In various embodiments, sub-sampling module 530 may sample every 1, 2, 4, or 8 pixels, both horizontally and vertically, of Y data 525 based on control values received from a programmable control register, system memory 130, or central control 320. Sub-sampling module 530 may then provide Y data 535 in a 16 bit format to a lookup table 540 for further processing and conversion to 8-bit data.

In one embodiment, pre-processing module 420 may include lookup table 540, which may be configured to perform functions of global tone mapping and/or gamma correction on luminance image data, such as Y data 535. In various embodiments, lookup table 540 may be implemented in hardware, firmware, or software, and/or elements of lookup table 540 may be stored in system memory 130. In an embodiment, lookup table 540 may include a one-dimensional (1D) lookup table having 65 entries of 8-bit values, which represent the output levels for the respective input levels, thereby enabling lookup table 540 to linearly interpolate the output values during gamma correction. Lookup table 540 may thus generate output data, such as Ygam data 545. In various embodiments, the gamma correction step may be bypassed, in which case the 8 most significant bits (MSBs) of input data (e.g., Y data 535) may be copied over to Ygam data 545 as 8-bit output data for further processing by keypoint detection circuit 430. In some embodiments, lookup table 540 may thus be configured to receive 16-bit input data and provide 8-bit output data for further processing by keypoint detection circuit 430.

In one embodiment, a keypoint may include a local maximum magnitude (i.e., strength) value that exceeds an adjustable keypoint sensitivity threshold. In an embodiment, a keypoint detection circuit may identify one or more locations of interest within an image (e.g., corners or junctions) that facilitating the identification and/or matching of an object in a first image to subsequent images that include the same object. In one embodiment, a keypoint detection operation may include computing a response to spatial filters to obtain approximations of the elements of a Hessian matrix (e.g., Dxx, Dyy, Dxy values), computing an approximation to the determinant of the Hessian at one or more pixels as a response metric, determining whether each respective local maximum magnitude is above an adjustable keypoint sensitivity threshold, determining whether the responses are indeed local maxima, and communicating with a memory module (e.g., via a direct memory access (DMA) module) in order to store keypoint output data in memory. In various embodiments, the keypoint output data may include a description of a keypoint, the Cartesian (X,Y) coordinates of a keypoint, the response magnitude (i.e., strength) of each respective local maximum magnitude (i.e., strength) value that exceeds the adjustable keypoint sensitivity threshold, a sign bit value (i.e., polarity) of a keypoint, and/or a description of one or more image edge scores (e.g., horizontal/vertical edge data). In an embodiment, the sign bit (polarity) value may include data configured to enable keypoint detection circuit 430 to detect light-to-dark and/or dark-to-light transitions in pixel data of an input image frame. In one embodiment, machine vision stage 318 and/or keypoint detection circuit 430 may be programmable to be selectively configured to detect keypoint pixel locations, horizontal edge data, and/or vertical edge data.

Figure 6:
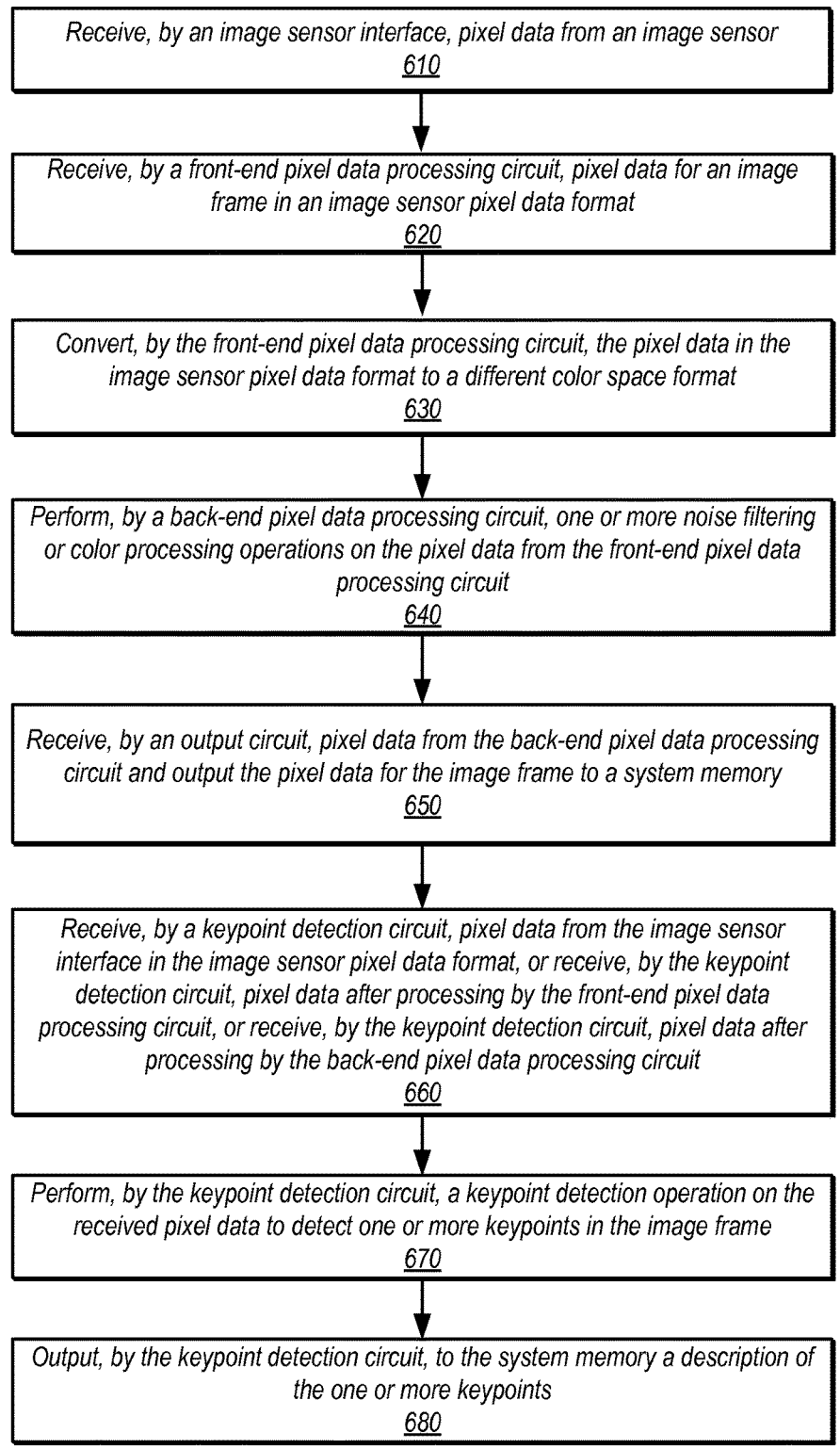
FIG. 6 is a high-level flowchart illustrating various methods and techniques for detecting keypoints in image data, according to some embodiments.

FIGS. 1-5 provide an example of an image processing pipeline, image signal processor, and system which may implement the detection of keypoints in image data in an image processing pipeline. However, numerous other types or configurations of systems or devices that implement an image processing pipeline and image signal processor may perform multi-rate processing for image data. FIG. 6 is a high-level flowchart illustrating various methods and techniques for detecting keypoints in image data, according to some embodiments. The various components described above may implement these techniques (in addition to those described with regard to FIG. 7, FIG. 8, and FIGS. 9A-9B below), as well as various other image processing pipelines and image signal processors.

As indicated at 610, an image sensor interface (e.g., sensor interface(s) 302) may receive raw pixel data from an image sensor (e.g., image sensor(s) 102). As depicted in block 620, a front-end pixel data processing circuit, such as raw processing stage 306, may receive pixel data for an image frame in an image sensor pixel data format. As illustrated in block 630, the front-end pixel data processing circuit may convert the pixel data in the image sensor pixel data format to a different color space format.

As indicated at block 640, a back-end pixel data processing circuit, such as noise processing stage 310 or color processing stage 312, may perform one or more noise filtering or color processing operations on the pixel data from the front-end pixel data processing circuit. As depicted in block 650, an output circuit, such as output rescale 314, may receive pixel data from the back-end pixel data processing circuit and output the pixel data for the image frame to a system memory, such as system memory 130.

As indicated at block 660, a keypoint detection circuit, such as keypoint detection circuit 430 or machine vision stage 318, may receive pixel data from the sensor interface(s) 302 in the image sensor pixel data format or receive pixel data after processing by the front-end pixel data processing circuit or the back-end pixel data processing circuit. In an embodiment, a multiplexer module (e.g., multiplexer 410) may receive input image data from one of multiple inputs. The multiple inputs may include raw pixel data from an image sensor module (e.g., sensor interface(s) 302), image data from a memory module (e.g., system memory 130), single channel and/or full color output data from a back-end output circuit (e.g., output rescale 314 or back-end module 340), or color space format data from one or more front-end pipeline stages and/or back-end pipeline stages of ISP 106. In an embodiment, a stream of raw pixel data collected from an image sensor may be received at an image signal processor (ISP). Raw pixel data may be captured and processed in stream fashion as it is collected at an image sensor. In one embodiment, raw image pixel data, as discussed above, may be formatted such that multiple color components or channels are not included for an individual pixel. An example of raw image data is a Bayer image format (of which there may be many variations) that includes different rows of pixel values for collecting light in different colors, green, red, and blue, which depend on the configuration of the image sensor. These pixel values (e.g., green values, red values, or blue values) may be collected and provided in raster order to the image signal processor, in some embodiments.

As indicated at block 670, the keypoint detection circuit may perform a keypoint detection operation on the received pixel data to detect one or more keypoints in the image frame. As illustrated at block 680, the keypoint detection circuit may output to the system memory a description of the one or more keypoints.

In one embodiment, an image may be divided into a grid having multiple regions (e.g., image frame 700 of FIG. 7, which is discussed below), such that each respective block of the grid may have one or more keypoints based on an adjustable keypoint sensitivity threshold. A hardware module, such as keypoint detection circuit 430 or machine vision stage 318, may be configured to detect keypoints and interface with software (e.g., program instructions 136) stored in a memory module in order to adjust the keypoint sensitivity threshold. For example, noise sensitivity may be reduced by raising the keypoint sensitivity threshold, thereby preventing local maxima of the response values due solely to image noise from being inadvertently identified as keypoints. In one embodiment, respective regions of an image may have a different keypoint sensitivity threshold value set by a software application. A software application may thus dynamically adjust one or more keypoint sensitivity thresholds of various regions of an image in response to the number and/or strength of keypoints detected by a hardware module (e.g., machine vision stage 318) in different regions of an image.

In some embodiments, processed image data, such as keypoint output data from keypoint detection circuit 430, as well as image data from some or all of the pipeline stage(s) of an image signal processor may be saved to a memory module (e.g., system memory 130). For example, keypoint output data may be saved to memory if a control unit, or other programmable component directs the ISP to store the processed image data and keypoints to memory. In this way other components, such as a CPU or GPU may perform image processing on the raw image and keypoint data by accessing the memory. Alternatively, the image data may be retrieved from memory and continue processing through the various ISP elements.

As indicated at 640, the keypoint detection circuit writes keypoint output data to a memory module (e.g., system memory 130). In one embodiment, various types of keypoint output data may include a description of a keypoint, coordinates of the keypoint (e.g., the x,y coordinates of a keypoint within an image), a response magnitude of the keypoint (e.g., a strength scoring value that exceeds an adjustable keypoint sensitivity threshold), and a sign bit value of the keypoint (e.g., a polarity value that identifies whether the center is bright or dark).

FIG. 7 is a logical block diagram illustrating an example image frame 700 for detecting keypoints in image data, according to some embodiments. In an embodiment, image frame 700 may correspond to an image divided into multiple regions, blocks, or grids. In one embodiment, image frame 700 may be configured to include multiple blocks 702A-N, where each block corresponds to a region of an input image frame. In one embodiment, image frame 700 may correspond to a 5×5 table having 25 total blocks, however any number of blocks may be used in various embodiments. Each of blocks 702A-N may be associated with one or more data values stored in the memory module. The data values corresponding to respective blocks (and thus respective regions of the input image frame) may include an adjustable keypoint sensitivity threshold value and the data of keypoint output value(s) detected within the respective region of the image. In some embodiments, one or more blocks may not include keypoint data (i.e., zero keypoints for that particular block) if machine vision stage 318 and/or keypoint detection circuit 430 did not detect any keypoints in the corresponding region of the image and/or if the keypoint(s) in that region did not exceed the adjustable keypoint sensitivity threshold. Conversely, in some embodiments, a block may include multiple keypoint values if machine vision stage 318 and/or keypoint detection circuit 430 detected multiple keypoints above the adjustable keypoint sensitivity threshold within the corresponding region of the image. In an embodiment, each of blocks 702A-N may be associated with different and independently adjustable keypoint sensitivity threshold values based on the attributes of the corresponding regions of an image. In another embodiment, register values stored in keypoint detection circuit 430 or stored in memory (e.g., system memory 130), may enable central control 320, machine vision stage 318, keypoint detection circuit 430, and/or program instructions 136 to dynamically adjust a maximum limit of keypoints allowed per block, a maximum number of keypoints allowed per line of a grid, and/or a maximum number of keypoints allowed to be written out by machine vision stage 318 and/or keypoint detection circuit 430 on a per-image basis. For example, a register value configured to correspond to a maximum number of keypoints per block or per line of a grid may ensure safe memory operation and thereby prevent ISP 106 from stalling when system (or memory access) bandwidth reaches high levels. Similarly, controlling a maximum allowable number of keypoints per image may enable ISP 106 to conserve processing time and thereby save power.

FIG. 8 is a logical block diagram illustrating an example image frame 800 for detecting keypoints in image data, according to some embodiments. In an embodiment, image frame 800 may be configured to include a grid of multiple blocks 802A-Z, where each block corresponds to a region of an input image frame. In one embodiment, FIG. 8 may correspond to a pared grid system, in which image frame 800 may be configured such that each of blocks 802A-Z may include a programmable maximum limit of keypoint values (e.g., a single keypoint having a maximum strength value relative to other detected keypoints in the region corresponding to the respective block). For example, if 10 is the maximum number per block and 10 or more keypoints are found in the block, the 10 with the highest response values will be output. In an embodiment, image frame 800 may also be configured such that one or more threshold regions 804A-N may overlap blocks 802A-Z in an arrangement that enables each of threshold regions 804A-N to include multiple ones of blocks 804A-Z. In such an embodiment, threshold regions 804A-N may be larger (in terms of image pixels) than blocks 802A-Z, and each threshold region may thus include a subset or group of blocks, where each block may include data corresponding to at most one (maximum) keypoint, and where the keypoints of the respective subset of blocks in a threshold region are each calculated by keypoint detection circuit 430 based on the particular dynamically adjustable keypoint sensitivity threshold value for that respective threshold region. The embodiment illustrated in FIG. 8 thus enables machine vision stage 318 and/or keypoint detection circuit 430 to utilize a more granular arrangement of keypoints with respect to the pixels of an input image frame, while maintaining a region-based model for the adjustable keypoint sensitivity threshold values (i.e., a keypoint detection scheme having a density that is programmable at a fine level combined with a keypoint sensitivity threshold that is programmable at a broader level).

In one embodiment, image frame 800 may be configured to have more blocks (and thus have an increased uniformity of keypoints and/or a higher resolution) relative to the example image frame depicted in FIG. 7. However, as noted above, any number of blocks may be used in various embodiments. Each of blocks 802A-Z may be associated with one or more data values, such as a local keypoint sensitivity threshold value and one or more descriptive keypoint values corresponding to the block. In an embodiment, blocks 802A-Z may be associated with independently adjustable keypoint sensitivity threshold values 804A-N. Keypoint detection module 430 and/or program instructions 136 may set the levels of keypoint sensitivity threshold values 804A-N based on a count of keypoints detected in the one or more of blocks 802A-Z in a respective region of an image frame corresponding to each of keypoint sensitivity threshold values 804A-N. In an embodiment, the regions of an image frame corresponding to keypoint sensitivity threshold values 804A-N may be relatively larger than the size of blocks 802A-Z, such that blocks 802A-Z may correspond to a finer grid to enable increased uniformity of detected keypoint values.

In the embodiment of FIG. 8, image frame 800 may be configured to store at most one keypoint per block. In various embodiments an image frame may be configured to include a programmable maximum number of keypoints allowed per block. In some embodiments, a programmable maximum number of keypoints may be set the same for all blocks in a grid (i.e., a uniform maximum limit for an entire grid), while in other embodiments, each block of a grid may include a different programmable maximum number of keypoints (i.e., independently programmable limits for various blocks in a grid). In all cases the highest scoring keypoints in the block are the ones saved. In an embodiment, paring down the number of keypoints found per block (e.g., to a maximum of 1 keypoint per block) may help enforce increased spatial uniformity for the keypoint data of an image. In such an embodiment, sometimes referred to as a "pared grid", the data values corresponding to respective blocks (i.e., respective regions of the input image frame) may thus include an adjustable keypoint sensitivity threshold value and the data corresponding to a maximum of one keypoint output value detected within each respective region of the image. In some embodiments, although a maximum of one keypoint per block may be enforced by machine vision stage 318 and/or keypoint detection circuit 430, one or more blocks may still not include any keypoint data (i.e., zero keypoints may be reported for a particular block) if keypoint detection circuit 430 did not detect any keypoints in the corresponding region of the image and/or if the keypoint(s) in that region did not exceed the adjustable keypoint sensitivity threshold. For embodiments in which a maximum limit of one keypoint value per block is enforced, machine vision stage 318 and/or keypoint detection circuit 430 may detect multiple keypoints above the adjustable keypoint sensitivity threshold within a region of the image corresponding to a single block and resolve the conflict by selecting a keypoint value having the highest magnitude value relative to the other keypoints detected in that block to be the single keypoint reported for that block. In one embodiment, if multiple keypoints are detected in a region corresponding to a block and two or more of the multiple keypoints share the same highest response magnitude value for that particular block (i.e., if two or more keypoints in a block have equally high magnitude values), then machine vision stage 318 and/or keypoint detection circuit 430 may select the keypoint that was found first for that particular block based on a raster order to be the single keypoint reported for that block. In other words, if two or more keypoints in a block have matching high magnitude values that exceed the keypoint sensitivity threshold, then the tie breaker may be the raster order in which the keypoints were detected.

In one embodiment, a pared grid system may include a maximum limit of one keypoint for the various blocks corresponding to regions of an input image frame, and the grid of blocks may be specified by register values stored in control parameter storage structure 440, stored in firmware of keypoint detection circuit 430, or stored in memory (e.g., system memory 130). For example, a pared grid enabling register of control parameter storage structure 440 may include a Boolean value that enables or disables a pared grid output mode configured to change a keypoint output order from a general raster order (e.g., a grid-wide raster output if the pared grid enabling register includes a "False" value) to a keypoint output mode in which keypoints are output in a raster fashion within respective blocks (e.g., a block-focused raster output if the pared grid enabling register includes a "True" value). One or more register values may specify the size of the blocks, as measured in pixels. Similarly, one or more register values may specify the number of blocks in horizontal and/or vertical dimensions that may correspond to regions of an input image frame.

FIG. 9A is a logical block diagram illustrating an example image frame 900A for detecting keypoints in image data, according to some embodiments. In one embodiment image frame 900A may be configured to correspond to a pared grid system (e.g., in a manner similar to the embodiment of FIG. 8). In an embodiment, image frame 900A may include one or more threshold regions 902A-N, each of which may include a subset of multiple blocks corresponding to groups of pixels of an input image frame. In various embodiments, threshold regions 902A-N may each correspond to an independently dynamically adjustable keypoint sensitivity threshold value thereby enabling machine vision stage 318 and/or keypoint detection circuit 430 to selectively adjust keypoint sensitivity threshold values by region of an image in response to real-time factors, such as the number of keypoints detected in one or more blocks of a threshold region, the magnitude (or strength) of the keypoints detected in one or more blocks of a threshold region, the sign bit (i.e., polarity) values of the keypoints detected in a threshold region, or other descriptive data corresponding to the keypoints detected in the threshold region. Note that the size and configuration of the various example keypoints depicted in FIGS. 9A and 9B are intended as an indication of keypoint strength for illustrative purposes and do not represent actual objects.

In an embodiment, machine vision stage 318 and/or keypoint detection circuit 430 may detect keypoints in one or more blocks corresponding to regions of an input image frame. Similarly, zero keypoints may be detected in the pixel data corresponding to other blocks. Data corresponding to one or more attributes of the detected keypoints (e.g., descriptive information of the keypoints, location/coordinate information, magnitude/strength information, and/or sign/polarity information) may be stored in control parameter storage structure 440 for further processing by machine vision stage 318 and/or keypoint detection circuit 430. For example, various blocks of image frame 900A may include above-threshold keypoint values 904A-N corresponding to detected keypoints having magnitude values that exceed a current value of the dynamically adjustable keypoint sensitivity threshold of the respective one of threshold regions 902A-N. Conversely, various blocks of an image frame may include below-threshold keypoint values 906A-N corresponding to detected keypoints having magnitude values that are below a current value of the dynamically adjustable keypoint sensitivity threshold of the respective one of threshold regions 902A-N.

For cases where multiple keypoints are detected in the same block of image frame 900A, the block may include a maximum magnitude keypoint value, such as one of maximum magnitude keypoint values 908A-N, having a magnitude (or strength) that exceeds the magnitude of the other detected keypoints in that respective block of image frame 900A. In an embodiment, keypoint detection circuit 430 may selectively report only the maximum magnitude keypoint value of a block, as depicted in FIG. 9B, which is discussed in further detail below. Returning to FIG. 9A, in one embodiment image frame 900A may include one or more blocks having multiple detected keypoints with similar magnitude values, such as similar magnitude keypoints 910A and 910B. In such an embodiment, keypoint detection circuit 430 may selectively report only an equally valued keypoint that was detected first in that block based on a raster order of the pixels for that block. For example, keypoint detection circuit 430 may report similar magnitude keypoint 910A and choose not to report similar magnitude keypoint 910B, as depicted in FIG. 9B, which is discussed below.

Note that in various embodiments, one or more blocks of image frame 900A may include combinations of the different types of detected keypoints, a single type of detected keypoint, or zero detected keypoints. The example of FIG. 9A is therefore not intended to be limiting.

FIG. 9B is a logical block diagram illustrating an example image frame 900B for detecting keypoints in image data, according to some embodiments. In one embodiment FIG. 9B may correspond to an output (i.e., processed) version of the image frame 900A of FIG. 9A. For example, above-threshold keypoint values 904A-N corresponding to detected keypoints having magnitude values that exceed a current value of the dynamically adjustable keypoint sensitivity threshold of the respective one of threshold regions 902A-N remain in the respective blocks in which the above-threshold keypoint values 904A-N were detected. Keypoint detection circuit 430 may have thus selected to report above-threshold keypoint values 904A-N as output data in response to determining that above-threshold keypoint values 904A-N were the detected keypoints in their respective blocks that exceeded the keypoint sensitivity threshold and were also stronger than other keypoints that may have been detected in the respective blocks. Conversely, below-threshold keypoint values 906A-N of FIG. 9A have been removed (i.e., not selected and/or otherwise filtered out) during processing by keypoint detection circuit 430. Below-threshold keypoint values 906A-N are thus not reported in the output data depicted in FIG. 9B.

In an embodiment, keypoint detection circuit 430 may selectively report maximum magnitude keypoint values 908A-N in the output data for their respective blocks while removing (i.e., not selecting or otherwise filtering out) one or more other keypoints in the respective block(s) that had magnitude values less than those of maximum magnitude keypoint values 908A-N. Maximum magnitude keypoint values 908A-N thus remain (i.e., are reported) in the output data depicted in FIG. 9B. In one embodiment, keypoint detection circuit 430 may selectively report similar magnitude keypoint 910A instead of one or more other keypoints having similar magnitude/strength values in the respective block. Similar magnitude keypoint 910A thus remains (i.e., is reported) in the output data depicted in FIG. 9B, while similar magnitude keypoint 910B has been removed (i.e., not reported or otherwise filtered out) during processing. The view illustrated in FIG. 9B may represent a version of keypoint output data with increased uniformity based on a paired grid model, as low magnitude keypoints (e.g., image noise data or other clutter) have been removed during processing.

In some embodiments, software, such as program instructions 136 stored in system memory 130, may perform various functions described above with respect to FIGS. 4-9. For example, in an embodiment program instructions 136 may dynamically facilitate the adjustment of values of control parameter storage structure 440 and/or keypoint sensitivity threshold values for one or more regions of an input image frame. In one embodiment, program instructions 136 and/or keypoint detection circuit 430 may monitor a number of detected keypoints per grid, per block, or per region of an input image and utilize the count of keypoints per grid, per block, or per region as a factor when determining whether to (and how much to) adjust the dynamically adjustable keypoint sensitivity threshold value(s) for the corresponding grid, block, or region.

A keypoint detection system having a dynamically adjustable keypoint sensitivity threshold and configured to receive input data from multiple sources and/or different stages of an image signal processing pipeline may thus efficiently implement computationally intensive keypoint calculations. Such a system may be useful for multiple applications, including object identification, object tracking, image stabilization, panorama stitching, high dynamic range (HDR) from multiple image captures, and other applications. For example, a keypoint detection circuit with a dynamically adjustable keypoint sensitivity threshold may enable a machine vision stage to detect and identify an object in a series of images regardless of changes in image attributes, such as noise, scale, or brightness.

What is claimed is:

1. An image signal processor, comprising:
an image sensor interface configured to receive pixel data from an image sensor;
a front-end pixel data processing circuit configured to:
receive pixel data for an image frame in an image sensor pixel data format; and
convert the pixel data in the image sensor pixel data format to a different color space format;
a back-end pixel data processing circuit configured to perform one or more noise filtering or color processing operations on the pixel data from the front-end pixel data processing circuit;
an output circuit configured to receive pixel data from the back-end pixel data processing circuit and output the pixel data for the image frame to a system memory; and
a keypoint detection circuit configured to:
receive pixel data from the image sensor interface in the image sensor pixel data format or receive pixel data after processing by the front-end pixel data processing circuit or the back-end pixel data processing circuit;
perform a keypoint detection operation on the received pixel data to detect one or more keypoints in the image frame; and
output to the system memory a description of the one or more keypoints.

2. The image signal processor of claim 1, further comprising a multiplexer circuit connected to the keypoint detection circuit, wherein the multiplexer circuit is configured to:
select pixel data from:
the image sensor interface;
the system memory; or
the back-end pixel data processing circuit; and
provide the pixel data to the keypoint detection circuit.

3. The image signal processor of claim 2, further comprising a pre-processing module connected between the multiplexer and the keypoint detection circuit, wherein the pre-processing module is configured to convert the pixel data into luminance channel data.

4. The image signal processor of claim 1, further comprising a keypoint control parameter storage structure connected to the keypoint detection circuit, wherein:
the keypoint control parameter storage structure is configured to store a plurality of keypoint sensitivity threshold values corresponding to a first set of respective regions of the image frame; and the keypoint detection circuit selectively outputs the description of the one or more keypoints detected in the first set of respective regions of the image frame in response to respective magnitude values of the one or more keypoints exceeding one of the plurality of keypoint sensitivity threshold values corresponding to the first set of respective regions of the image frame.

5. The image signal processor of claim 4, wherein:
the keypoint detection circuit is configured to output a respective count of keypoints detected in each region of the first set of respective regions of the image frame; and
the respective count of keypoints detected in each region of the first set of respective regions of the image frame is usable by program instructions to dynamically adjust one of the plurality of keypoint sensitivity threshold values.

6. The image signal processor of claim 4, wherein the keypoint control parameter storage structure is configured to store:
a programmable maximum limit of allowable keypoints for each of a second set of respective regions of the image frame usable by the keypoint detection circuit to output the description of a total number of keypoints for each of the second set of respective regions of the image frame, wherein the total number of keypoints for each of the second set of respective regions does not exceed the programmable maximum limit of allowable keypoints; and
a programmable size of the second set of respective regions of the image frame, wherein the second set of respective regions corresponding to the programmable maximum limit of allowable keypoints are smaller regions of the image frame than the first set of respective regions corresponding to the plurality of adjustable keypoint sensitivity threshold values.

7. The image signal processor of claim 1, wherein the image signal processor is configured to operate in a low power mode in which:
one or more stages of the front-end pixel data processing circuit and the back-end pixel data processing circuit enter an inactive state;
the image sensor interface and the keypoint detection circuit remain in an active state configured to continue to output the description of the one or more keypoints to the system memory while the one or more stages of the front-end pixel data processing circuit and the back-end pixel data processing circuit enter the inactive state; and
the one or more stages of the front-end pixel data processing circuit and the back-end pixel data processing circuit enter an active state in response to the keypoint detection circuit detecting one or more keypoints.

8. A method for an image signal processor, comprising:
receiving, by an image sensor interface, pixel data from an image sensor;
receiving, by a front-end pixel data processing circuit, pixel data for an image frame in an image sensor pixel data format;
converting, by the front-end pixel data processing circuit, the pixel data in the image sensor pixel data format to a different color space format;
performing, by a back-end pixel data processing circuit, one or more noise filtering or color processing operations on the pixel data from the front-end pixel data processing circuit;
receiving, by an output circuit, pixel data from the back-end pixel data processing circuit and outputting the pixel data for the image frame to a system memory;
receiving, by a keypoint detection circuit:
pixel data from the image sensor interface in the image sensor pixel data format;
pixel data after processing by the front-end pixel data processing circuit; or
pixel data after processing by the back-end pixel data processing circuit;
performing, by the keypoint detection circuit, a keypoint detection operation on the received pixel data to detect one or more keypoints in the image frame; and
outputting, by the keypoint detection circuit, to the system memory a description of the one or more keypoints.

9. The method of claim 8, further comprising:
selecting, by a multiplexer circuit connected to the keypoint detection circuit, pixel data from:
the image sensor interface;
the system memory; or
the back-end pixel data processing circuit; and
providing, by the multiplexer circuit, the pixel data to the keypoint detection circuit.

10. The method of claim 9, further comprising converting, by a pre-processing module connected between the multiplexer and the keypoint detection circuit, the pixel data into luminance channel data.

11. The method of claim 8, further comprising:
storing, by a keypoint control parameter storage structure connected to the keypoint detection circuit, a plurality of keypoint sensitivity threshold values corresponding to a first set of respective regions of the image frame; and
selectively outputting, by the keypoint detection circuit, the description of the one or more keypoints detected in the first set of respective regions of the image frame in response to respective magnitude values of the one or more keypoints exceeding one of the plurality of keypoint sensitivity threshold values corresponding to the first set of respective regions of the image frame.

12. The method of claim 11, further comprising outputting, by the keypoint detection circuit, a count of keypoints detected in the first set of respective regions of the image frame, wherein
the count of keypoints detected in the first set of respective regions of the image frame is usable by program instructions to dynamically adjust one of the plurality of keypoint sensitivity threshold values.

13. The method of claim 11, further comprising:
storing, by the keypoint control parameter storage structure, a programmable maximum limit of allowable keypoints for each of a second set of respective regions of the image frame usable by the keypoint detection circuit to output the description of a total number of keypoints for each of the second set of respective regions of the image frame, wherein the total number of keypoints for each of the second set of respective regions does not exceed the programmable maximum limit of allowable keypoints; and
storing, by the keypoint control parameter storage structure, a programmable size of the second set of respective regions of the image frame, wherein the second set of respective regions corresponding to the programmable maximum limit of allowable keypoints are smaller regions of the image frame than the first set of respective regions corresponding to the plurality of adjustable keypoint sensitivity threshold values.

14. A device, comprising:
a central processing unit;
a display connected to the central processing unit;
a system memory connected to the central processing unit; and
an image signal processor connected to the central processing unit, wherein the image signal processor comprises:
  an image sensor interface configured to receive pixel data from an image sensor;
  a front-end pixel data processing circuit configured to:
    receive pixel data for an image frame in an image sensor pixel data format; and
    convert the pixel data in the image sensor pixel data format to a different color space format;
  a back-end pixel data processing circuit configured to perform one or more noise filtering or color processing operations on the pixel data from the front-end pixel data processing circuit;
  an output circuit configured to receive pixel data from the back-end pixel data processing circuit and output the pixel data for the image frame to the system memory; and
  a keypoint detection circuit configured to:
    receive pixel data from the image sensor interface in the image sensor pixel data format or receive pixel data after processing by the front-end pixel data processing circuit or the back-end pixel data processing circuit;
    perform a keypoint detection operation on the received pixel data to detect one or more keypoints in the image frame; and
    output to the system memory a description of the one or more keypoints.

15. The device of claim 14, further comprising a multiplexer circuit connected to the keypoint detection circuit, wherein the multiplexer circuit is configured to:
  select pixel data from:
    the image sensor interface;
    the system memory; or
    the back-end pixel data processing circuit; and
  provide the pixel data to the keypoint detection circuit.

16. The device of claim 15, further comprising a pre-processing module connected between the multiplexer and the keypoint detection circuit, wherein the pre-processing module is configured to convert the pixel data into luminance channel data.

17. The device of claim 14, further comprising a keypoint control parameter storage structure connected to the keypoint detection circuit, wherein:
  the keypoint control parameter storage structure is configured to store a plurality of keypoint sensitivity threshold values corresponding to a first set of respective regions of the image frame; and
  the keypoint detection circuit selectively outputs the description of the one or more keypoints detected in the first set of respective regions of the image frame in response to respective magnitude values of the one or more keypoints exceeding one of the plurality of keypoint sensitivity threshold values corresponding to the first set of respective regions of the image frame.

18. The device of claim 17, wherein:
  the keypoint detection circuit outputs a count of keypoints detected in the first set of respective regions of the image frame; and
  the count of keypoints detected in the first set of respective regions of the image frame is usable by program instructions to dynamically adjust one of the plurality of keypoint sensitivity threshold values.

19. The device of claim 17, wherein the keypoint control parameter storage structure is configured to store:
  a programmable maximum limit of allowable keypoints for each of a second set of respective regions of the image frame usable by the keypoint detection circuit to output the description of a total number of keypoints for each of the second set of respective regions of the image frame, wherein the total number of keypoints for each of the second set of respective regions does not exceed the programmable maximum limit of allowable keypoints; and
  a programmable size of the second set of respective regions of the image frame, wherein the second set of respective regions corresponding to the programmable maximum limit of allowable keypoints are smaller regions of the image frame than the first set of respective regions corresponding to the plurality of adjustable keypoint sensitivity threshold values.

20. The device of claim 14, wherein the image signal processor is configured to operate in a low power mode, wherein:
  one or more stages of the front-end pixel data processing circuit and the back-end pixel data processing circuit enter an inactive state in response to the keypoint detection circuit not detecting one or more keypoints for a pre-defined time period;
  the image sensor interface and the keypoint detection circuit remain in an active state configured to continue to output the description of the one or more keypoints to the system memory while the one or more stages of the front-end pixel data processing circuit and the back-end pixel data processing circuit enter the inactive state; and
  the one or more stages of the front-end pixel data processing circuit and the back-end pixel data processing circuit enter an active state in response to the keypoint detection circuit detecting one or more keypoints.

* * * * *